(12) United States Patent
Shankar et al.

(10) Patent No.: US 9,652,139 B1
(45) Date of Patent: May 16, 2017

(54) GRAPHICAL REPRESENTATION OF AN OUTPUT

(71) Applicant: Palantir Technologies Inc., Palo Alto, CA (US)

(72) Inventors: Ankit Shankar, Redwood City, CA (US); Casey Patton, Corona, CA (US); Geoff Stowe, San Francisco, CA (US); John McRaven, New York City, NY (US); Mikhail Proniushkin, Palo Alto, CA (US); Sarah Gershkon, London (GB)

(73) Assignee: Palantir Technologies Inc., Palo Alto, CA (US)

( * ) Notice: Subject to any disclaimer, the term of this patent is extended or adjusted under 35 U.S.C. 154(b) by 0 days.

(21) Appl. No.: 15/216,476

(22) Filed: Jul. 21, 2016

Related U.S. Application Data

(60) Provisional application No. 62/319,031, filed on Apr. 6, 2016.

(51) Int. Cl.
  *G06F 3/048* (2013.01)
  *G06F 3/0484* (2013.01)
  *G06F 3/0482* (2013.01)

(52) U.S. Cl.
  CPC ........ *G06F 3/04847* (2013.01); *G06F 3/0482* (2013.01)

(58) Field of Classification Search
  CPC .......................... G06F 3/04847; G06F 3/0482
  See application file for complete search history.

(56) References Cited

U.S. PATENT DOCUMENTS

| 6,430,305 B1 | 8/2002 | Decker |
| 6,820,135 B1 | 11/2004 | Dingman et al. |
| 6,978,419 B1 | 12/2005 | Kantrowitz |

(Continued)

FOREIGN PATENT DOCUMENTS

| CN | 102546446 A | 7/2012 |
| CN | 103167093 A | 6/2013 |

(Continued)

OTHER PUBLICATIONS

"5 Great Tools for Visualizing your Twitter Followers", Amnet Blog, http://www.amnetblog.com/component/content/article/115-5-great-tools-for-visualizing-your-twitter-followers.html, (Aug. 4, 2010), 1-5.

(Continued)

*Primary Examiner* — Omar Abdul-Ali
(74) *Attorney, Agent, or Firm* — Schwegman Lundberg & Woessner, P.A.

(57) ABSTRACT

Aspects of the present disclosure relate to graphical representation of an output. A server provides for presentation, at a display device, of a first graphical representation of an output for a class. The server receives a selection of a time range for the class. The server determines, based on the output for the class during the selected time range, a baseline output. The server provides for presentation, in response to the selection of the time range, of a second graphical representation of the output, during the time range, for a family from the class, the second graphical representation indicating a difference between the output for the family and an output value for the family predicted based on the baseline output.

20 Claims, 15 Drawing Sheets

(56) References Cited

U.S. PATENT DOCUMENTS

| | | | |
|---|---|---|---|
| 6,980,984 B1 | 12/2005 | Huffman et al. | |
| 7,168,039 B2 | 1/2007 | Bertram | |
| 7,617,232 B2 | 11/2009 | Gabbert et al. | |
| 7,672,814 B1* | 3/2010 | Raanan | H04L 41/5058 702/182 |
| 7,756,843 B1 | 7/2010 | Palmer | |
| 7,899,796 B1 | 3/2011 | Borthwick et al. | |
| 7,917,376 B2 | 3/2011 | Bellin et al. | |
| 7,941,321 B2 | 5/2011 | Greenstein et al. | |
| 8,036,971 B2 | 10/2011 | Aymeloglu et al. | |
| 8,046,283 B2 | 10/2011 | Burns et al. | |
| 8,054,756 B2 | 11/2011 | Chand et al. | |
| 8,214,490 B1 | 7/2012 | Vos et al. | |
| 8,229,902 B2 | 7/2012 | Vishniac et al. | |
| 8,290,838 B1 | 10/2012 | Thakur et al. | |
| 8,302,855 B2 | 11/2012 | Ma et al. | |
| 8,473,454 B2 | 6/2013 | Evanitsky et al. | |
| 8,484,115 B2 | 7/2013 | Aymeloglu et al. | |
| 8,589,273 B2 | 11/2013 | Creeden et al. | |
| 8,688,573 B1 | 4/2014 | Rukonic et al. | |
| 8,744,890 B1 | 6/2014 | Bernier et al. | |
| 8,812,960 B1 | 8/2014 | Sun et al. | |
| 8,924,388 B2 | 12/2014 | Elliot et al. | |
| 8,924,389 B2 | 12/2014 | Elliot et al. | |
| 8,938,686 B1 | 1/2015 | Erenrich et al. | |
| 8,949,164 B1 | 2/2015 | Mohler | |
| 9,100,428 B1 | 8/2015 | Visbal | |
| 9,129,219 B1 | 9/2015 | Robertson et al. | |
| 2002/0065708 A1 | 5/2002 | Senay et al. | |
| 2002/0095360 A1 | 7/2002 | Joao | |
| 2002/0095658 A1 | 7/2002 | Shulman et al. | |
| 2002/0103705 A1 | 8/2002 | Brady | |
| 2002/0147805 A1 | 10/2002 | Leshem et al. | |
| 2003/0126102 A1 | 7/2003 | Borthwick | |
| 2004/0034570 A1 | 2/2004 | Davis | |
| 2004/0111480 A1 | 6/2004 | Yue | |
| 2004/0153418 A1 | 8/2004 | Hanweck | |
| 2004/0236688 A1 | 11/2004 | Bozeman | |
| 2005/0010472 A1 | 1/2005 | Quatse et al. | |
| 2005/0086207 A1 | 4/2005 | Heuer et al. | |
| 2005/0154628 A1 | 7/2005 | Eckart et al. | |
| 2005/0154769 A1 | 7/2005 | Eckart et al. | |
| 2006/0026120 A1 | 2/2006 | Carolan et al. | |
| 2006/0143034 A1 | 6/2006 | Rothermel et al. | |
| 2006/0143075 A1 | 6/2006 | Carr et al. | |
| 2006/0143079 A1 | 6/2006 | Basak et al. | |
| 2007/0000999 A1 | 1/2007 | Kubo et al. | |
| 2007/0011304 A1 | 1/2007 | Error | |
| 2007/0038646 A1 | 2/2007 | Thota | |
| 2007/0150801 A1 | 6/2007 | Chidlovskii et al. | |
| 2007/0156673 A1 | 7/2007 | Maga et al. | |
| 2007/0185867 A1 | 8/2007 | Maga et al. | |
| 2007/0284433 A1 | 12/2007 | Domenica et al. | |
| 2008/0222295 A1 | 9/2008 | Robinson et al. | |
| 2008/0255973 A1 | 10/2008 | El Wade et al. | |
| 2008/0313132 A1 | 12/2008 | Hao et al. | |
| 2009/0106178 A1 | 4/2009 | Chu | |
| 2009/0112745 A1 | 4/2009 | Stefanescu | |
| 2009/0125359 A1 | 5/2009 | Knapic et al. | |
| 2009/0125459 A1 | 5/2009 | Norton et al. | |
| 2009/0187546 A1 | 7/2009 | Hamilton Whyte | |
| 2009/0187548 A1 | 7/2009 | Ji et al. | |
| 2009/0249244 A1 | 10/2009 | Robinson et al. | |
| 2009/0271343 A1 | 10/2009 | Vaiciulis et al. | |
| 2009/0307049 A1 | 12/2009 | Elliott, Jr. et al. | |
| 2009/0313463 A1 | 12/2009 | Pang et al. | |
| 2009/0319891 A1 | 12/2009 | MacKinlay et al. | |
| 2010/0030722 A1 | 2/2010 | Goodson et al. | |
| 2010/0031141 A1 | 2/2010 | Summers et al. | |
| 2010/0042922 A1 | 2/2010 | Bradateanu et al. | |
| 2010/0057622 A1 | 3/2010 | Faith | |
| 2010/0070842 A1 | 3/2010 | Aymeloglu et al. | |
| 2010/0098318 A1 | 4/2010 | Anderson | |
| 2010/0114887 A1 | 5/2010 | Conway et al. | |
| 2010/0131502 A1 | 5/2010 | Fordham | |
| 2010/0161735 A1 | 6/2010 | Sharma | |
| 2010/0191563 A1 | 7/2010 | Schlaifer et al. | |
| 2010/0235915 A1 | 9/2010 | Memon et al. | |
| 2010/0262688 A1 | 10/2010 | Hussain et al. | |
| 2010/0312837 A1 | 12/2010 | Bodapati et al. | |
| 2011/0061013 A1 | 3/2011 | Bilicki et al. | |
| 2011/0078173 A1 | 3/2011 | Seligmann et al. | |
| 2011/0093327 A1 | 4/2011 | Fordyce, III et al. | |
| 2011/0099133 A1 | 4/2011 | Chang et al. | |
| 2011/0106723 A1* | 5/2011 | Chipley | G06Q 10/06 705/348 |
| 2011/0153384 A1 | 6/2011 | Horne et al. | |
| 2011/0173093 A1 | 7/2011 | Psota et al. | |
| 2011/0191343 A1* | 8/2011 | Heaton | G06F 19/3443 707/737 |
| 2011/0208565 A1 | 8/2011 | Ross et al. | |
| 2011/0213655 A1 | 9/2011 | Henkin et al. | |
| 2011/0218955 A1 | 9/2011 | Tang et al. | |
| 2011/0270604 A1 | 11/2011 | Qi et al. | |
| 2011/0270834 A1 | 11/2011 | Sokolan et al. | |
| 2011/0289397 A1 | 11/2011 | Eastmond et al. | |
| 2011/0295649 A1 | 12/2011 | Fine et al. | |
| 2011/0314007 A1 | 12/2011 | Dassa et al. | |
| 2011/0314024 A1 | 12/2011 | Chang et al. | |
| 2012/0011238 A1 | 1/2012 | Rathod | |
| 2012/0011245 A1 | 1/2012 | Gillette et al. | |
| 2012/0022945 A1 | 1/2012 | Falkenborg et al. | |
| 2012/0054284 A1 | 3/2012 | Rakshit | |
| 2012/0059853 A1 | 3/2012 | Jagota | |
| 2012/0066166 A1 | 3/2012 | Curbera et al. | |
| 2012/0079363 A1 | 3/2012 | Folting et al. | |
| 2012/0084117 A1 | 4/2012 | Tavares et al. | |
| 2012/0084287 A1 | 4/2012 | Lakshminarayan et al. | |
| 2012/0131512 A1 | 5/2012 | Takeuchi et al. | |
| 2012/0159362 A1 | 6/2012 | Brown et al. | |
| 2012/0173381 A1 | 7/2012 | Smith | |
| 2012/0215784 A1 | 8/2012 | King et al. | |
| 2012/0221553 A1 | 8/2012 | Wittmer et al. | |
| 2012/0226523 A1 | 9/2012 | Weiss et al. | |
| 2012/0245976 A1 | 9/2012 | Kumar et al. | |
| 2012/0271473 A1* | 10/2012 | Koch | G06Q 30/0206 700/295 |
| 2012/0323888 A1 | 12/2012 | Osann, Jr. | |
| 2013/0016106 A1 | 1/2013 | Yip et al. | |
| 2013/0054306 A1 | 2/2013 | Bhalla et al. | |
| 2013/0057551 A1 | 3/2013 | Ebert et al. | |
| 2013/0096988 A1 | 4/2013 | Grossman et al. | |
| 2013/0110746 A1 | 5/2013 | Ahn | |
| 2013/0151453 A1 | 6/2013 | Bhanot et al. | |
| 2013/0166348 A1 | 6/2013 | Scotto | |
| 2013/0166480 A1 | 6/2013 | Popescu et al. | |
| 2013/0185245 A1 | 7/2013 | Anderson et al. | |
| 2013/0185307 A1 | 7/2013 | El-yaniv et al. | |
| 2013/0226318 A1 | 8/2013 | Procyk et al. | |
| 2013/0238616 A1 | 9/2013 | Rose et al. | |
| 2013/0246170 A1 | 9/2013 | Gross et al. | |
| 2013/0246537 A1 | 9/2013 | Gaddala | |
| 2013/0246597 A1 | 9/2013 | Iizawa et al. | |
| 2013/0263019 A1 | 10/2013 | Castellanos et al. | |
| 2013/0282696 A1 | 10/2013 | John et al. | |
| 2013/0290825 A1 | 10/2013 | Arndt et al. | |
| 2013/0297619 A1 | 11/2013 | Chandrasekaran et al. | |
| 2013/0304770 A1 | 11/2013 | Boero | |
| 2014/0012796 A1 | 1/2014 | Petersen et al. | |
| 2014/0040371 A1 | 2/2014 | Gurevich et al. | |
| 2014/0058914 A1 | 2/2014 | Song et al. | |
| 2014/0068487 A1 | 3/2014 | Steiger et al. | |
| 2014/0095509 A1 | 4/2014 | Patton | |
| 2014/0108380 A1 | 4/2014 | Gotz et al. | |
| 2014/0108985 A1 | 4/2014 | Scott et al. | |
| 2014/0123279 A1 | 5/2014 | Bishop et al. | |
| 2014/0136285 A1 | 5/2014 | Carvalho | |
| 2014/0143009 A1 | 5/2014 | Brice et al. | |
| 2014/0156527 A1 | 6/2014 | Grigg et al. | |
| 2014/0157172 A1 | 6/2014 | Peery et al. | |
| 2014/0164502 A1 | 6/2014 | Khodorenko et al. | |
| 2014/0189536 A1 | 7/2014 | Lange et al. | |
| 2014/0195515 A1 | 7/2014 | Baker et al. | |
| 2014/0222521 A1 | 8/2014 | Chait | |

(56) References Cited

U.S. PATENT DOCUMENTS

| | | | |
|---|---|---|---|
| 2014/0222793 A1 | 8/2014 | Sadkin et al. | |
| 2014/0229554 A1 | 8/2014 | Grunin et al. | |
| 2014/0344230 A1 | 11/2014 | Krause et al. | |
| 2014/0358829 A1 | 12/2014 | Hurwitz | |
| 2014/0366132 A1 | 12/2014 | Stiansen et al. | |
| 2015/0032583 A1* | 1/2015 | Mello | G06Q 50/06 705/30 |
| 2015/0066966 A1* | 3/2015 | O'Donnell | H04L 67/10 707/756 |
| 2015/0073929 A1 | 3/2015 | Psota et al. | |
| 2015/0073954 A1 | 3/2015 | Braff | |
| 2015/0095773 A1 | 4/2015 | Gonsalves et al. | |
| 2015/0100897 A1 | 4/2015 | Sun et al. | |
| 2015/0106379 A1 | 4/2015 | Elliot et al. | |
| 2015/0135256 A1 | 5/2015 | Hoy et al. | |
| 2015/0160162 A1* | 6/2015 | Darland | G01N 27/622 250/281 |
| 2015/0188872 A1 | 7/2015 | White | |
| 2015/0213631 A1* | 7/2015 | Vander Broek | G06T 11/206 345/589 |
| 2015/0338233 A1 | 11/2015 | Cervelli et al. | |
| 2015/0363251 A1* | 12/2015 | Wang | G06F 11/0757 714/55 |
| 2015/0379413 A1 | 12/2015 | Robertson et al. | |
| 2016/0004764 A1 | 1/2016 | Chakerian et al. | |

FOREIGN PATENT DOCUMENTS

| | | |
|---|---|---|
| CN | 102054015 B | 5/2014 |
| DE | 102014204827 A1 | 9/2014 |
| DE | 102014204830 A1 | 9/2014 |
| DE | 102014204834 A1 | 9/2014 |
| EP | 2487610 A2 | 8/2012 |
| EP | 2858018 A1 | 4/2015 |
| EP | 2869211 A2 | 5/2015 |
| EP | 2889814 A1 | 7/2015 |
| EP | 2892197 A1 | 7/2015 |
| EP | 2963595 A1 | 1/2016 |
| WO | WO-2005116851 A2 | 12/2005 |

OTHER PUBLICATIONS

"About OWA", Open Web Analytics, [Online]. Retrieved from the Internet: <URL: http://www.openwebanalytics.com/?page_jd=2>, (Accessed: Jul. 19, 2013), 5 pgs.

"An Introduction to KeyLines and Network Visualization", http://keylines.com/wp-content/uploads/2014/03/KeyLines-White-Paper.pdf, (Mar. 2014), 8 pgs.

"Analytics for Data Driven Startups", Trakio, [Online]. Retrieved from the Internet: <URL: http://trak.io/>, (Accessed: Jul. 18, 2013), 3 pgs.

"Appacts: Open Source Mobile Analytics Platform", http://www.appacts.com, (Jul. 18, 2013), 1-4.

"U.S. Appl. No. 13/827,491, Final Office Action mailed Jun. 22, 2015", 28 pgs.

"U.S. Appl. No. 13/827,491, Non Final Office Action mailed Oct. 9, 2015", 16 pgs.

"U.S. Appl. No. 13/827,491, Non Final Office Action mailed Dec. 1, 2014", 5 pgs.

"U.S. Appl. No. 14/141,252, Non Final Office Action mailed Oct. 8, 2015", 11 pgs.

"U.S. Appl. No. 14/225,006, Advisory Action mailed Dec. 21, 2015", 4 pgs.

"U.S. Appl. No. 14/225,006, Final Office Action mailed Sep. 2, 2015", 28 pgs.

"U.S. Appl. No. 14/225,006, First Action Interview Pre-Interview Communication mailed Feb. 27, 2015", 5 pgs.

"U.S. Appl. No. 14/225,006, First Action Interview Pre-Interview Communication mailed Sep. 10, 2014", 4 pgs.

"U.S. Appl. No. 14/225,084, Examiner Interview Summary mailed Jan. 4, 2016", 3 pgs.

"U.S. Appl. No. 14/225,084, First Action Interview Pre-Interview Communication Feb. 20, 2015", 5 pgs.

"U.S. Appl. No. 14/225,084, Non Final Office Action mailed Sep. 2, 2014", 4 pgs.

"U.S. Appl. No. 14/225,084, Non Final Office Action mailed Sep. 11, 2015", 13 pgs.

"U.S. Appl. No. 14/225,084, Notice of Allowance mailed May 4, 2015", 26 pgs.

"U.S. Appl. No. 14/225,160, Advisory Action mailed May 20, 2015", 7 pgs.

"U.S. Appl. No. 14/225,160, Final Office Action mailed Feb. 11, 2015", 30 pgs.

"U.S. Appl. No. 14/225,160, First Action Interview Pre-Interview Communication mailed Jul. 29, 2014", 19 pgs.

"U.S. Appl. No. 14/225,160, First Action Interview Pre-Interview Communication mailed Oct. 22, 2014", 6 pgs.

"U.S. Appl. No. 14/225,160, Non Final Office Action mailed Aug. 12, 2015", 23 pgs.

"U.S. Appl. No. 14/306,138, Examiner Interview Summary mailed Dec. 3, 2015", 3 pgs.

"U.S. Appl. No. 14/306,138, Examiner Interview Summary mailed Dec. 24, 2015", 5 pgs.

"U.S. Appl. No. 14/306,147, Final Office Action mailed Dec. 24, 2015", 22 pgs.

"U.S. Appl. No. 14/319,161, Final Office Action mailed Jan. 23, 2015", 21 pgs.

"U.S. Appl. No. 14/319,161, Notice of Allowance mailed May 4, 2015", 6 pgs.

"U.S. Appl. No. 14/323,935, Notice of Allowance mailed Oct. 1, 2015", 8 pgs.

"U.S. Appl. No. 14/451,221, Non Final Office Action mailed Oct. 21, 2014", 16 pgs.

"U.S. Appl. No. 14/463,615, Advisory Action mailed Sep. 10, 2015", 3 pgs.

"U.S. Appl. No. 14/463,615, Final Office Action mailed May 21, 2015", 31 pgs.

"U.S. Appl. No. 14/463,615, First Action Interview Pre-Interview Communication mailed Jan. 28, 2015", 29 pgs.

"U.S. Appl. No. 14/463,615, First Action Interview Pre-Interview Communication mailed Nov. 13, 2014", 4 pgs.

"U.S. Appl. No. 14/463,615, Non Final Office Action mailed Dec. 9, 2015", 44 pgs.

"U.S. Appl. No. 14/479,863, First Action Interview Pre-Interview Communication mailed Dec. 26, 2014", 5 pgs.

"U.S. Appl. No. 14/479,863, Notice of Allowance mailed Mar. 31, 2015", 23 pgs.

"U.S. Appl. No. 14/483,527, Final Office Action mailed Jun. 22, 2015", 17 pgs.

"U.S. Appl. No. 14/483,527, First Action Interview Pre-Interview Communication mailed Jan. 28, 2015", 6 pgs.

"U.S. Appl. No. 14/483,527, Non Final Office Action mailed Oct. 28, 2015", 20 pgs.

"U.S. Appl. No. 14/552,336, First Action Interview Pre-Interview Communication mailed Jul. 20, 2015", 18 pgs.

"U.S. Appl. No. 14/552,336, Notice of Allowance mailed Nov. 3, 2015", 13 pgs.

"U.S. Appl. No. 14/562,524, First Action Interview Pre-Interview Communication mailed Sep. 14, 2015", 12 pgs.

"U.S. Appl. No. 14/562,524, First Action Interview Pre-Interview Communication mailed Nov. 10, 2015", 6 pgs.

"U.S. Appl. No. 14/571,098, First Action Interview mailed Aug. 24, 2015", 4 pgs.

"U.S. Appl. No. 14/571,098, First Action Interview Pre-Interview Communication mailed Mar. 11, 2015", 4 pgs.

"U.S. Appl. No. 14/571,098, First Action Interview Pre-Interview Communication mailed Aug. 5, 2015", 4 pgs.

"U.S. Appl. No. 14/571,098, First Action Interview Pre-Interview Communication mailed Nov. 10, 2015", 5 pgs.

"U.S. Appl. No. 14/631,633, First Action Interview Pre-Interview Communication mailed Sep. 10, 2015", 5 pgs.

"U.S. Appl. No. 14/676,621, Examiner Interview Summary mailed Jul. 30, 2015", 5 pgs.

(56) References Cited

OTHER PUBLICATIONS

"U.S. Appl. No. 14/676,621, Final Office Action mailed Oct. 29, 2015", 10 pgs.
"U.S. Appl. No. 14/746,671, First Action Interview Pre-Interview Communication mailed Nov. 12, 2015", 19 pgs.
"U.S. Appl. No. 14/746,671, Notice of Allowance mailed Jan. 21, 2016", 7 pgs.
"U.S. Appl. No. 14/800,447, First Action Interview Pre-Interview Communication mailed Dec. 10, 2015", 26 pgs.
"U.S. Appl. No. 14/813,749, Non Final Office Action mailed Sep. 28, 2015", 22 pgs.
"U.S. Appl. No. 14/842,734, First Action Interview Pre-Interview Communication mailed Nov. 19, 2015", 17 pgs.
"Apsalar—Mobile App Analytics & Advertising", https://apsalar.com./, (Jul. 18, 2013), 1-8.
"Beta Testing on the Fly", TestFlight, [Online]. Retrieved from the Internet: <URL: https://testflightapp.com/>, (Accessed: Jul. 18, 2013), 3 pgs.
"Countly", Countly Mobile Analytics, [Online]. Retrieved from the Internet: <URL: http://count.ly/products/screenshots, (accessed Jul. 18, 2013), 9 pgs.
"DISTIMO", [Online]. Retrieved from the Internet: <URL: http://www.distimo.com/app-analytics, (accessed Jul. 18, 2013), 5 pgs.
"European Application Serial No. 14187996.5, Extended European Search Report mailed Feb. 12, 2015", 7 pgs.
"European Application Serial No. 14191540.5, Extended European Search Report mailed May 27, 2015", 9 pgs.
"European Application Serial No. 14200246.8, Extended European Search Report mailed May 29, 2015", 8 pgs.
"European Application Serial No. 14200298.9, Extended European Search Report mailed May 13, 2015", 7 pgs.
"European Application Serial No. 15181419.1, Extended European Search Report mailed Sep. 29, 2015", 7 pgs.
"European Application Serial No. 15184764.7, Extended European Search Report mailed Dec. 14, 2015", 8 pgs.
"Flurry", [Online]. Retrieved from the Internet: <URL: http://www.flurry.com/, (accessed Jul. 18, 2013), 14 pgs.
"Google Analytics Official Website—Web Analytics & Reporting", [Online]. Retrieved from the Internet: <URL: http ://www.google.com/analytics/index.html, (accessed Jul. 18, 2013), 22 pgs.
"Great Britain Application Serial No. 1404486.1, Combined Search Report and Examination Report mailed Aug. 27, 2014", 5 pgs.
"Great Britain Application Serial No. 1404486.1, Office Action mailed May 21, 2015", 2 pgs.
"Great Britain Application Serial No. 1404489,5, Combined Search Report and Examination Report mailed Aug. 27, 2014", 5 pgs.
"Great Britain Application Serial No. 1404489.5, Office Action mailed May 21, 2015", 3 pgs.
"Great Britain Application Serial No. 1404489.5, Office Action mailed Oct. 6, 2014", 1 pgs.
"Great Britain Application Serial No. 1404499.4, Combined Search Report and Examination Report mailed Aug. 20, 2014", 6 pgs.
"Great Britain Application Serial No. 1404499.4, Office Action mailed Jun. 11, 2015", 5 pgs.
"Great Britain Application Serial No. 1404499.4, Office Action mailed Sep. 29, 2014", 1 pg.
"Help File for ModelRisk Version 5—Part 1", Vose Software, (2007), 375 pgs.
"Help File for ModelRisk Version 5—Part 2", Vose Software, (2007), 362 pgs.
"Hunchlab: Heat Map and Kernel Density Calculation for Crime Analysis", Azavea Journal, [Online], Retrieved from the Internet: <www.azavea.com/blogs/newsletter/v4i4/kernel-density-capabilities-added-to-hunchlab>, (Sep. 9, 2014), 2 pgs.
"KeyLines Datasheet", http://keylines.com/wp-content/uploads/2014/03/KeyLines-datasheet.pdf, (Mar. 2014), 2 pgs.
"KeyLines: Visualizing Threats: Improved Cyber Security Through Network Visualization", http://keylines.com/wp-content/uploads/2014/04/Visualizing-Threats1.pdf, (Apr. 2014), 10 pgs.
"Liberating Web Analytics", Piwik, [Online]. Retrieved from the Internet: <URL: http://piwik.org/>, (Accessed: Jul. 19, 2013), 18 pgs.
"Mixpanel: Actions speak louder than page views", Mobile Analytics, [Online]. Retrieved from the Internet: <URL: https://mixpanel.com/>, (Accessed: Jul. 18, 2013), 3 pgs.
"Mobile App Marketing & Analytics", Localytics, [Online]. Retrieved from the Internet: <URL: http://www.localytics.com/>, (Accessed: Jul. 18, 2013), 12 pgs.
"More than android analytics", UserMetrix, [Online]. Retrieved from the Internet: <URL: http://usermetrix.com/android-analytics>, (Accessed: Jul. 18, 2013), 3 pgs.
"More Than Mobile Analytics", Kontagent, [Online]. Retrieved from the Internet: <URL: http://www. kontagent. com/>, (Accessed: Jul. 18, 2013), 9 pgs.
"Multimap", Wikipedia, [Online]. Retrieved from the Internet: <URL: https://en.wikipedia.org/w/index.php?title=Multimap&oldid=530800748>, (Jan. 1, 2013), 2 pgs.
"Netherlands Application Serial No. 2012417, Netherlands Search Report mailed Sep. 18, 2015", W/ English Translation, 9 pgs.
"Netherlands Application Serial No. 2012421, Netherlands Search Report mailed Sep. 18, 2015", 8 pgs.
"Netherlands Application Serial No. 2012438, Search Report mailed Sep. 21, 2015", 8 pgs.
"New Zealand Application Serial No. 622473, First Examination Report mailed Mar. 27, 2014", 3 pgs.
"New Zealand Application Serial No. 622473, Office Action mailed Jun. 19, 2014", 2 pgs.
"New Zealand Application Serial No. 622513, Office Action mailed Apr. 3, 2014", 2 pgs.
"New Zealand Application Serial No. 628161, First Examination Report mailed Aug. 25, 2014", 2 pgs.
"Realtime Constant Customer Touchpoint", Capptain- Pilot your apps, (accessed Jul. 18, 2013), 6 pgs.
"Refresh CSS ellipsis when resizing container", Stack Overflow, [Online], Retrieved from the Internet: <URL: http://stackoverflow.com/questions/17964681/refresh-css-ellipsis-when- resizing-container>, (Accessed: May 18, 2015), 1 pg.
"Welcome to StatCounter—Visitor Analysis for Your Website", StatCounter, [Online]. Retrieved from the Internet: <URL: http://statcounter.com/>, (Accessed: Jul. 19, 2013), 17 pgs.
Celik, T, "CSS Basic User Interface Module Level 3 (CSS3 UI)", Section 8; Resizing and Overflow; http://www.w3.org/TR/2012/WD-css3-ui-20120117/#resizing-amp-overflow, Retrieved on May 18, 2015, (Jan. 17, 2012), 1-58.
Chaudhuri, Surajit, et al., "An Overview of Business Intelligence Technology", Communications of the ACM, vol. 54, No, 8., (Aug. 2011), 88-98.
Cohn, David, et al., "Semi-supervised Clustering with User Feedback", Cornell University, (2003), 9 pgs.
Gorr, et al., "Crime Hot Spot Forecasting: Modeling and Comparative Evaluation", Grant 98-IJ-CX-K005, (May 6, 2002), 37 pgs.
Gu, Lifang, et al., "Record Linkage: Current Practice and Future Directions", (Jan. 15, 2004), 32 pgs.
Hansen, et al,, "Analyzing Social Media Networks with NodeXL: Insights from a Connected World", Chapter 4, 10, (Sep. 2010), 16 pgs.
Hua, Yu, et al., "A Multi-attribute Data Structure with Parallel Bloom Filters for Network Services", HiPC 2006, LNCS 4297, (2006), 277-288.
Manno, et al., "Introducing Collaboration in Single-user Applications through the Centralized Control Architecture", (2010), 10 pgs.
Sigrist, Christian, et al., "PROSITE, a Protein Domain Database for Functional Characterization and Annotation", Nucleic Acids Research, vol. 38, (2010), D161-D166.
Valentini, Giorgio, et al., "Ensembles of Learning Machines", Lecture Notes in Computer Science: Neural Nets, Springer Berlin Heidelberg, (Sep. 26, 2002), 3-20.
Wang, Guohua, et al., "Research on a Clustering Data De-Duplication Mechanism Based on Bloom Filter", IEEE, (2010), 5 pgs.

\* cited by examiner

GRAPHICAL REPRESENTATION OF AN OUTPUT

PRIORITY CLAIM

This application claims priority to U.S. Provisional Patent Application No. 62/319,031, filed on Apr. 6, 2016, entitled "GRAPHICAL REPRESENTATION OF AN OUTPUT," the entire content of which is incorporated herein by reference.

TECHNICAL FIELD

The subject matter disclosed herein relates to machines for generating graphical representations. In particular, example embodiments may relate to machines for generating a graphical representation of an output.

BACKGROUND

Relationships between inputs and outputs are the subject of many research inquiries. Example research inquiries may concentrate on a relationship between temperature and cold beverage consumption or a relationship between pressure and ore or mineral extraction. One challenge is providing a meaningful graphical representation of the relationship between the input and the output in the results of these research inquires.

BRIEF DESCRIPTION OF THE DRAWINGS

Various ones of the appended drawings merely illustrate example embodiments of the present inventive subject matter and cannot be considered as limiting its scope.

DETAILED DESCRIPTION

Figure 1:
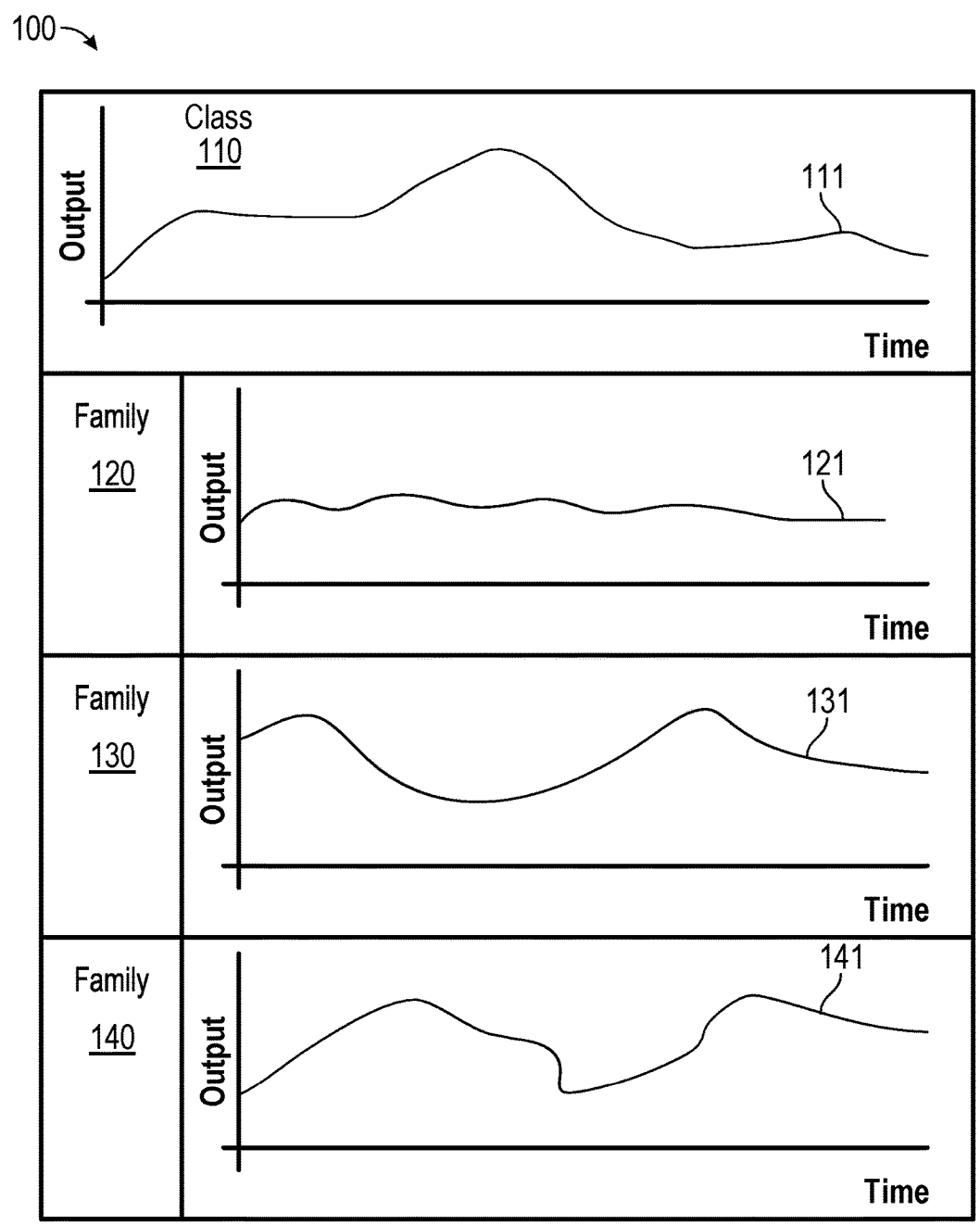
FIG. 1 is a diagram of an example graphical representation of output versus time for a class and families from the class, according to some embodiments.

Reference will now be made in detail to specific example embodiments for carrying out the inventive subject matter. Examples of these specific embodiments are illustrated in the accompanying drawings, and specific details are set forth in the following description in order to provide a thorough understanding of the subject matter. It will be understood that these examples are not intended to limit the scope of the claims to the illustrated embodiments. On the contrary, they are intended to cover such alternatives, modifications, and equivalents as may be included within the scope of the disclosure. Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

As noted above, relationships between inputs and outputs are the subject of many research inquiries. Example research inquiries may concentrate on a relationship between temperature and cold beverage consumption or a relationship between pressure and ore or mineral extraction. One challenge is providing a meaningful graphical representation of the relationship between the input and the output in the results of these research inquires.

In some aspects, the subject technology provides techniques for providing a graphical representation of an output, relating the output to an input or to time, and for managing input and output data collected over time. The output may be provided for a class, which may be subdivided into families. Each family may be subdivided into genera, and each genus may be subdivided into species.

According to some implementations, a server provides for presentation, at a display device of a client device, of a first graphical representation of an output for a class. In some examples, the first graphical representation is an output versus time graph, with input values presented in an additional graph or table in a sidebar. The server receives a user selection of a time range for the class. The time range corresponds to a time when the output was within an optimal range (e.g., an ideal or semi-ideal output range, for example, the output being greater than a threshold value). The server determines, based on the output for the class during the selected time range, a baseline output. The server provides (e.g., transmits data to a client device) for presentation, in response to the selection of the time range, of a second graphical representation, during the time range, for a family from the class. The second graphical representation is then presented at the client device. In some examples, the display is presented via execution of JavaScript code. In some examples, the second graphical representation is an output versus time graph for the family. The second graphical representation indicates a difference between the output for the family and an output value for the family predicted based on the baseline output.

In some embodiments, an optimal baseline is selected (e.g., by a user) to correspond to a time when the output was ideal, not necessarily any specific inputs. For example, when the subject technology is implemented in a gas extraction context, the output versus time is displayed in a graph. The "Output" corresponds to a 'total production of the system' and is the sum of "inputs" like 'production from platform A', 'production from pipe L', and the like. If a user or a machine observes a drop in production he/she/it is trying to diagnose, he/she/it may highlight a portion of the graph where output was "ideal" and set that portion of the graph as the baseline. It should be noted that this technique does not require knowledge of the specific inputs (platforms, pipes, etc.). However, doing this analysis allows the user or the machine to see what has changed with the inputs, between the baseline/ideal time and the time being studied, and what could be attributed to the change in the output. The inputs and outputs may be presented in any known form. In some cases, the inputs and outputs are presented in graphical form or in a graph. In some cases, the inputs and outputs are presented in tabular form or in a table.

The time range selected can be any time the user wants to compare against (not necessarily an "optimal" output time range). For example, may be production/consumption/output has improved, and the user wishes to study why this happened. In this case, the user may select a time range when the output was lower to compare with the time range after the improvement occurred.

According to some embodiments, the optimal output time may be automatically selected as the time when the production/output was at its peak. However, in alternative embodiments, the user selects the optimal output time. User selection, rather than automatic selection, may be desirable because the user (e.g., an analyst) may have some knowledge about the system being studied and can choose a "realistic" optimal point or a "local" maxima, rather than an "unrealistic global maximum." In one example, gas production in a gas field was at an all time high in March, but there was a dip in October, and the user wishes to study this October dip. In this case, it might not make sense to set the production period in March as the baseline and compare against October, as platforms might have come online/gone offline during the months between March and October. In other word, almost all the inputs might be different in March and October. On the other hand, the knowledgeable user/analyst might select a time immediately before the October dip, since the user/analyst knows the system was basically the same immediately before and after the dip, and it makes sense to do this comparison.

As used herein, the terms "class," "family," "genus," and "species" encompass their plain and ordinary meaning. In addition, a class may refer to any set that can be subdivided into components called families. Each family in all or a portion of the families, in turn, can be subdivided into components called genera (plural of genus). Each genus in all or a portion of the genera, in turn, can be subdivided into components called species.

In one example, a class is the United States. The families are the fifty states. The genera are counties within the states, and the species are cities within the counties. In another example, a class is a field from which natural resources (e.g., oil, gas, ore, minerals, and the like) are extracted. The families are regions of the field, which are divided into sub-regions corresponding to the genera. The species are the individual wells or mines.

The subject technology may be used in a number of contexts, including for example, the context of natural resource extraction or man-made resource generation. The natural resource extraction context may be applicable to the extraction of natural gas, oil, or other natural gas resources based on environmental condition inputs, such as pressure. The man-made resource generation context may be applicable to the generation of electricity (e.g., solar power, hydroelectric power, and the like) based on environmental condition inputs, such as temperature, pressure, sky cover (e.g., for solar energy), rainfall (e.g., for hydroelectric energy), or snow melt. In the electricity generation context, information from multiple times in the past may need to be taken into account. For example, for a hydroelectric plant near a waterfall in the spring, the amount of water may depend on recent rainfall, amount of snow cover, and recent temperatures that caused snow melt.

FIGS. 1-4, discussed in detail below, illustrate various example graphical representations. These graphical representations can be presented at a computing device, for example, using display unit(s), such as screen(s) or projector(s). In some implementations, the graphical representations are presented within a web browser window or a window of a special purpose application for generating the graphical representations.

FIG. 1 is a diagram of an example graphical representation 100 of output versus time for a class 110 and families 120, 130, and 140 from the class 110. In one example, FIG. 1 measures consumption of a specified soda in the United States over time, where the class 110 is the United States, the family 120 is the state of California, the family 130 is the state of Arizona, and the family 140 is the state of Nevada. As shown in FIG. 1, a curve 111 represents output versus time for the class 110. A curve 121 represents output versus time for the family 120. A curve 131 represents output versus time for the family 130. A curve 141 represents output versus time for the family 140.

Figure 2:
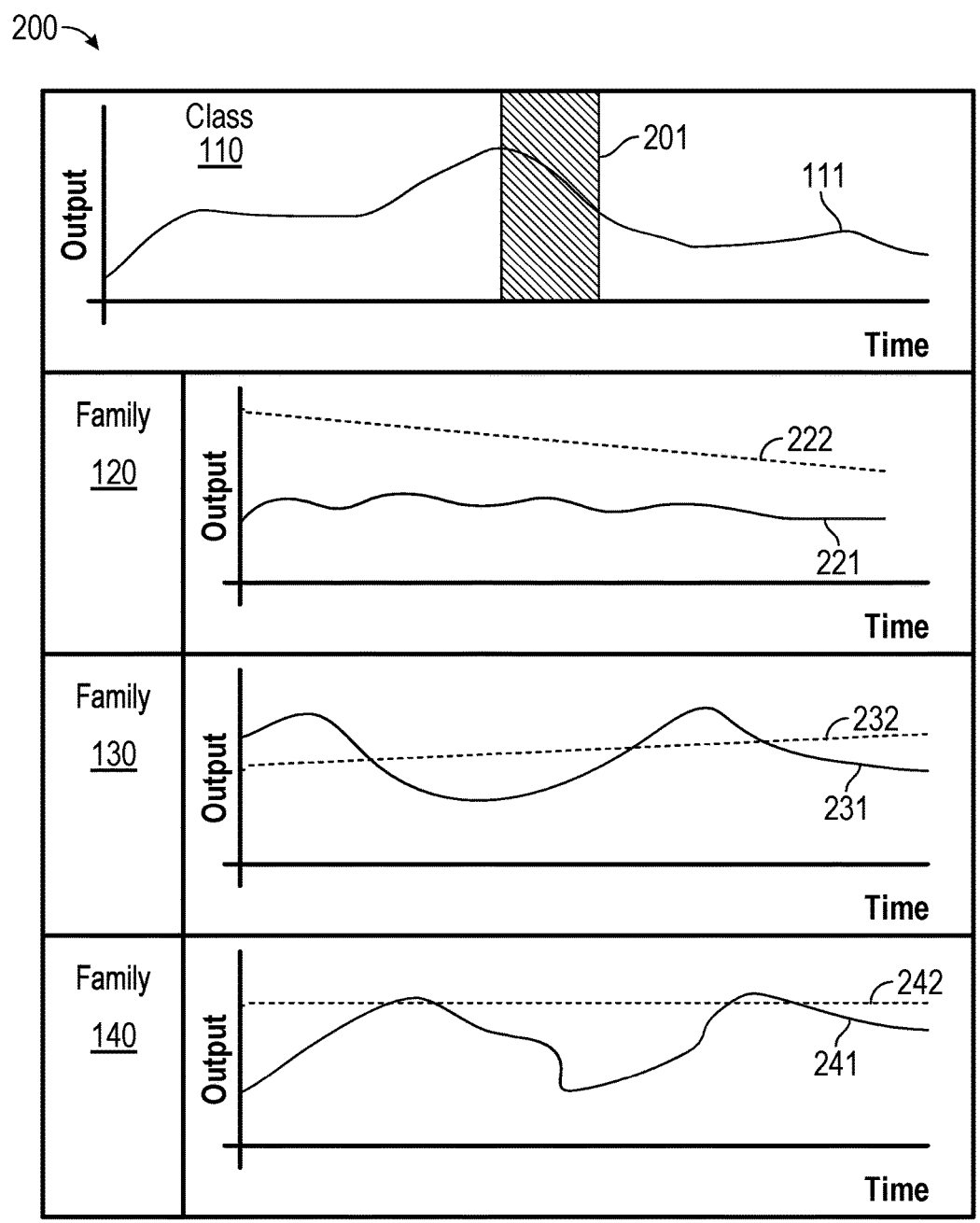
FIG. 2 is a diagram of an example graphical representation of output versus time for a class and families from the class, indicating a selection of a time range, according to some embodiments.

FIG. 2 is a diagram of an example graphical representation 200 of output versus time for the class 110 and families 120, 130, and 140 from the class 110, indicating a selection of a time range 201. As shown, the time range 201 is selected, by the user, by highlighting (e.g., by clicking and dragging a mouse over) a region of the output versus time graph for the class 110. The selected time range 201 is selected, by a user, to correspond to a time when an output variable was within an optimal range. In the soda consumption example, the selected time may correspond to a time when soda consumption was maximized or above a threshold value. In the gas (or any other natural or man-made resource, such as oil or electricity) production example, the selected time may correspond to a time when gas (or other resource) production was maximized. Comparing the selected baseline time period with a second time period may provide information about which inputs have changed between the baseline time period and the second time period and, therefore, which inputs may be responsible for changes in the output. In the soda example, the inputs may include, temperature, city, and the like. In the gas example, the inputs may include environmental conditions (e.g., pressure) and the like.

As shown in FIG. 2, in response to the user's selection of the time range, the output versus time graphs for the families 120, 130, and 140 are zoomed into the selected time range 201. The selected time range is set as a baseline and an output value is predicted for each family 120, 130, and 140 based on an input/output or time/output relationship for the baseline. The input/output or time/output relationship for the baseline can be determined by applying regression analysis to time/input/output values. The predicted output value for the family 120 is shown by curve 222, and the actual output value is shown by curve 221. The predicted output value for the family 130 is shown by curve 232, and the actual output value is shown by curve 231. The predicted output value for the family 140 is shown by curve 242, and the actual output value is shown by curve 241.

Figure 3:
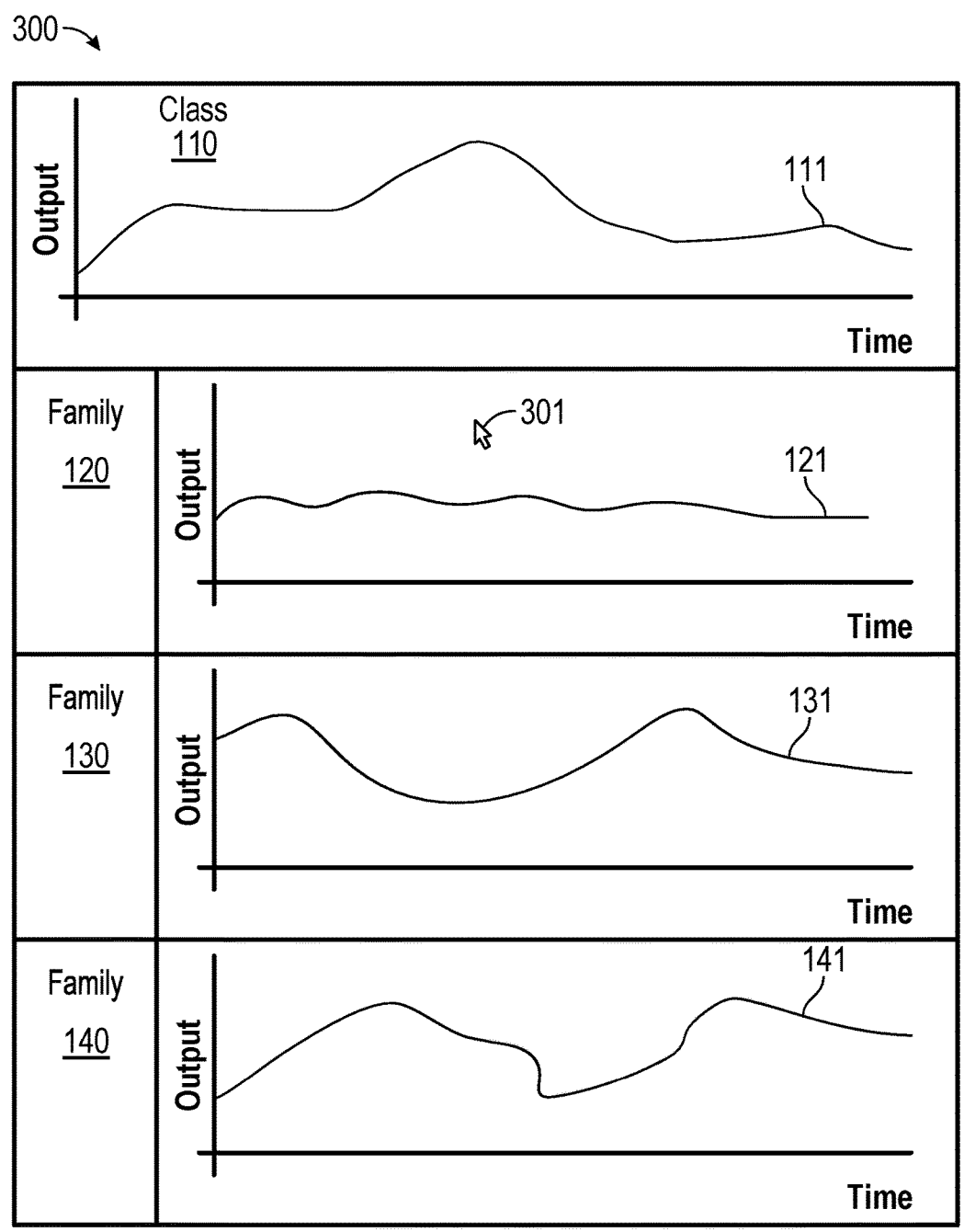
FIG. 3 is a diagram of an example graphical representation of output versus time for a class and families from the class, indicating a selection of a family, according to some embodiments.

FIG. 3 is a diagram of an example graphical representation 300 of output versus time for the class 110 and families 120, 130, and 140 from the class 110, indicating a selection of a family 120. As FIG. 1, FIG. 3 includes the output versus time curves 121, 131, and 141 for the families 120, 130, and 140, respectively. As shown in FIG. 3, the user selects the family 120 by placing the cursor 301 over a region of the graphical representation 300 for the family 120 and clicking the cursor 301. In alternative implementations, the user selects the family 120 by touching touchscreen in the region of the graphical representation 300 for the family 120. In response to the user's selection, a graphical representation as shown in FIG. 4 is presented.

Figure 4:
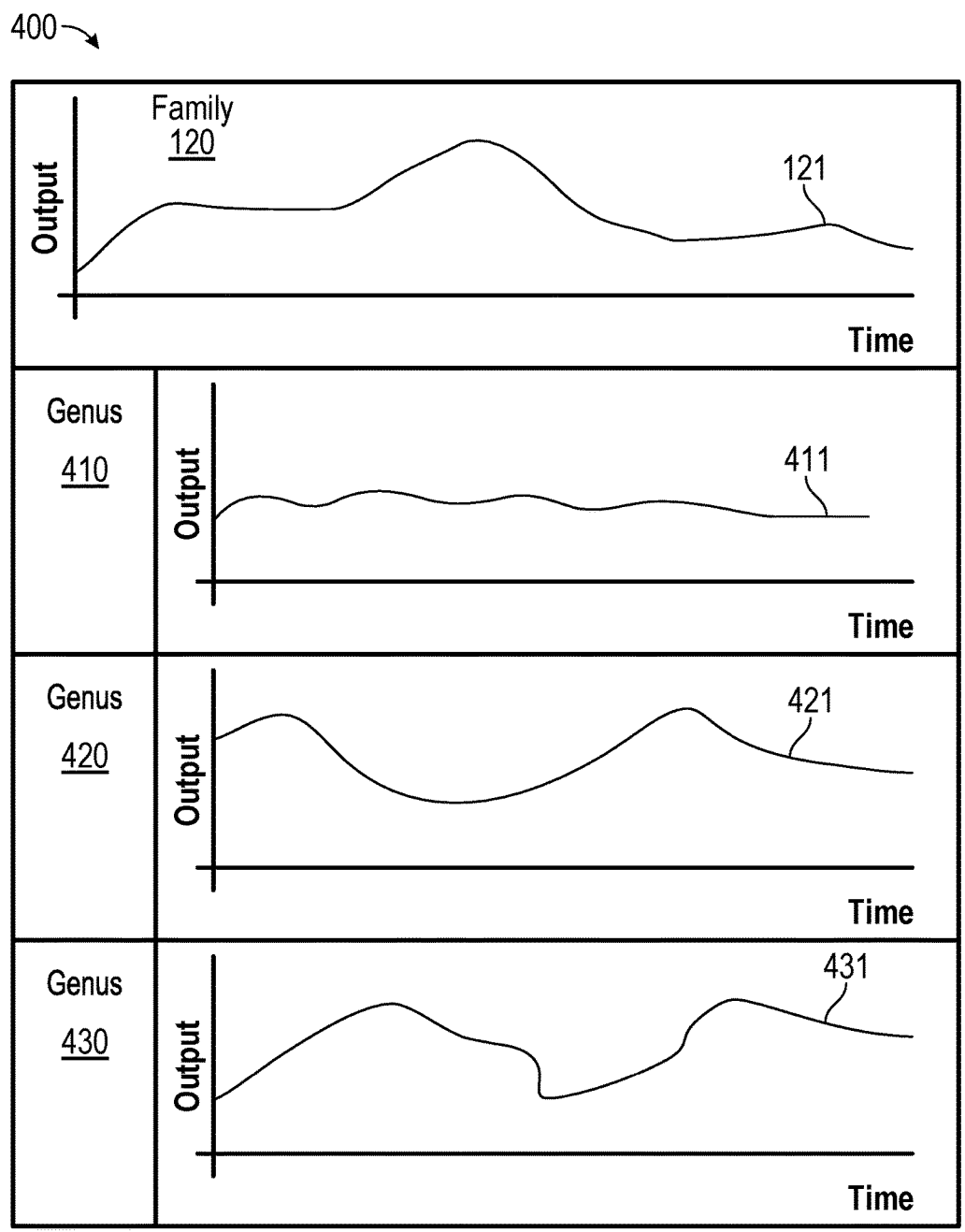
FIG. 4 is a diagram of an example graphical representation of output versus time for a family and genera from the family, according to some embodiments.

FIG. 4 is a diagram of an example graphical representation 400 of output versus time for a family 120 and genera 410, 420, and 430 from the family 120. In some cases, the graphical representation 400 in response to the user's selection (e.g., using the cursor 301) of the family 120 in the graphical representation 300 of FIG. 3. As shown in FIG. 3, the curve 121 represents output versus time for the family 120. A curve 411 represents output versus time for the genus 410. A curve 421 represents output versus time for the genus 420. A curve 431 represents output versus time for the genus 430. To continue with the example above, where the class 100 represents the United States, and the family 120 represents the state of California, the genera 410, 420, and 430 represent counties in California. For example, genus 410 represents San Francisco County, genus 420 represents Los Angeles County, and genus 430 represents San Diego County.

In yet another example, the class is a set of fields from which natural resources (e.g., oil or gas) are extracted. Each family is an individual field. Each genus is a collection of nearby pipelines or wells. Each species is an individual pipeline or well. In a further example, the class is a set of hydroelectric plants. The family is an individual hydroelectric plant. The genus is a component of the hydroelectric plant. The species is a subcomponent of the component of the hydroelectric plant.

Figure 5:
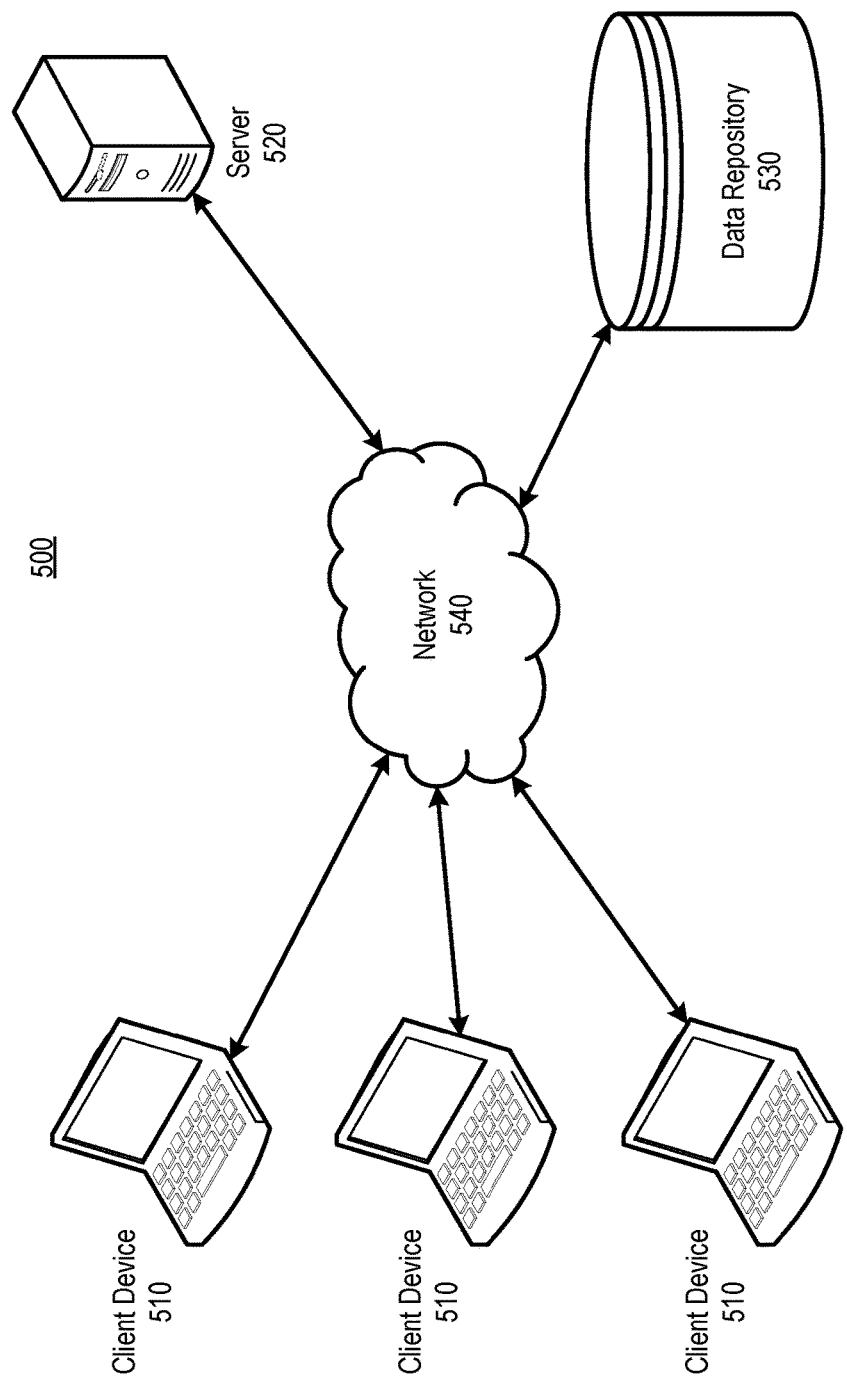
FIG. 5 is a diagram of an example system in which a graphical representation of an output may be generated, according to some embodiments.

FIG. 5 is a diagram of an example system 500 in which a graphical representation of an output may be generated. As shown, the system 500 includes client device(s) 510, a server 520, and a data repository 530 connected to one another via a network 540. The network 540 may include one or more of the Internet, an intranet, a local area network, a wide area network (WAN), a cellular network, a WiFi network, a virtual private network (VPN), a public network, a wired network, a wireless network, etc.

The client device(s) 510 may include one or more of a laptop computer, a desktop computer, a mobile phone, a tablet computer, a personal digital assistant (PDA), a digital music player, and the like. The client device 510 includes include an application (or multiple applications), such as a web browser or a special purpose application, for communicating with the server 520 and the data repository 530. Using the application, a user of the client device 510, may access and interface with graphical representations, such as those illustrated in FIGS. 1-4. The client device includes or is coupled with a display device, such as one or more screens or projectors, which displays the graphical representations. While three client devices 510 are illustrated in FIG. 5, the subject technology may be implemented with any number of client device(s) 510.

The server 520 stores data or instructions. The server 520 is programmed to generate graphical representations, such as those illustrated in FIGS. 1-4, and provide an interface for a user of the client device 510 to access the graphical representations. More detailed examples of the operation of the server 520 are provided in conjunction with FIGS. 7-8.

The data repository 530 stores input and output values that are accessible to the server 520 for generating the graphical representations. The data repository 530 can be implemented as a database or any other data storage structure. The data repository 530 can be used to store any input/output values. Example input/output values relate pressure to natural resource (e.g., oil, gas, ore, or mineral) production, relate temperature to beverage (e.g., soda, tea, coffee, or beer) or food (e.g., ice cream) consumption, or relate air pollution to percentage of people with diseases (e.g., cough, sore throat, cold, or lung disease). In some cases, the data in the data repository 530 is subdivided by class, family, genus, and species, and each data item is associated with a specified time. More detailed examples of the operation of the data repository 530 are provided in conjunction with FIG. 6.

In the implementation of FIG. 5, the system 500 include a single data repository 530 and a single server 520. However, the subject technology may be implemented with multiple data repositories or multiple servers. Furthermore, as shown in FIG. 3, a single network 540 connects the client device(s) 510, the server 520, and the data repository 530. However, the subject technology may be implemented using multiple networks to connect the machines. Additionally, while the server 520 and the data repository 530 are illustrated as being distinct machines, in some examples, a single machine functions as both the server 520 and the data repository 530. In one example, a single machine implements the functions of all of the client device 510, the server 520, and the data repository 530. The single machine either has or lacks a network connection.

Figure 6:
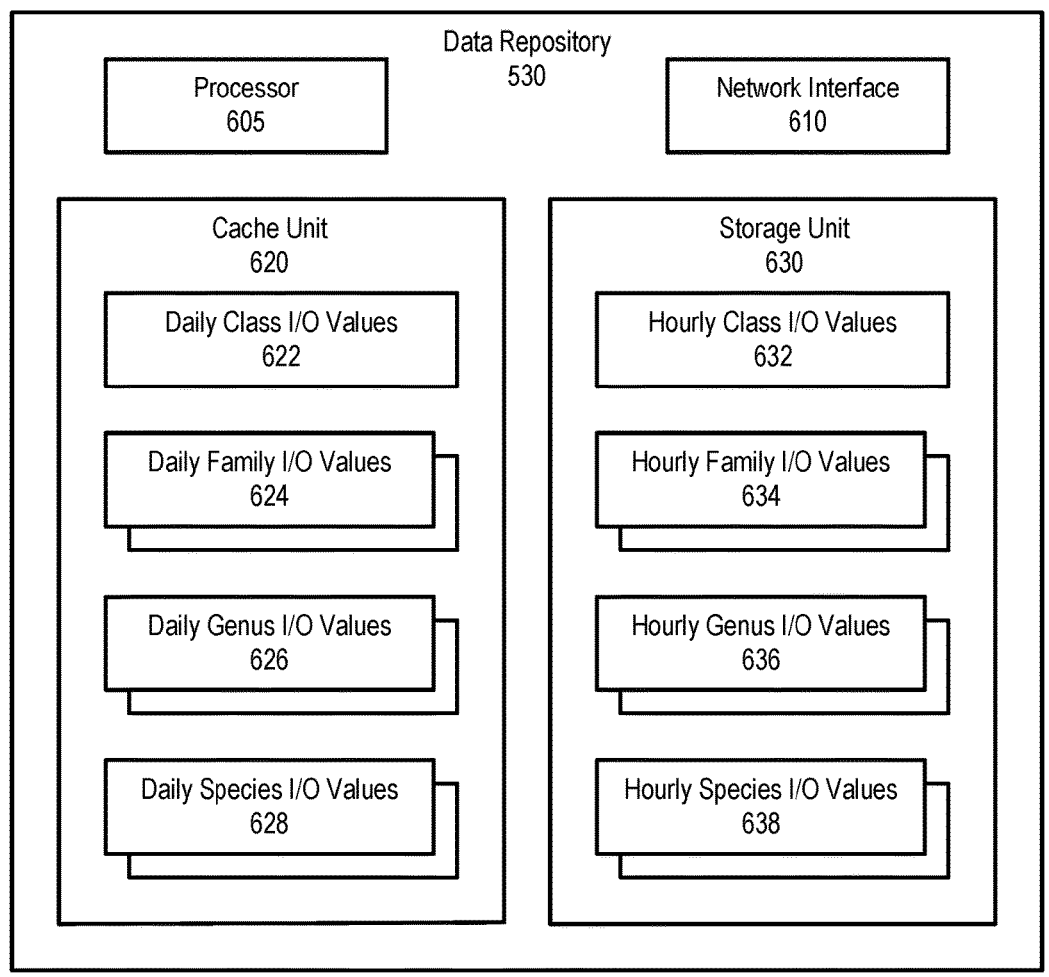
FIG. 6 is a block diagram of an example of the data repository of FIG. 5, according to some embodiments, according to some embodiments, according to some embodiments.

FIG. 6 is a block diagram of an example of the data repository 530 of FIG. 5. As shown, the data repository 530 includes a processor 405, a network interface 410, a cache unit 620, and a storage unit 630. The processor 405 executes machine instructions, which may be stored in the cache unit 620 or the storage unit 630. While a single processor 605 is illustrated, the data repository 530 may include multiple processors arranged into multiple processing units (e.g., central processing unit (CPU), graphics processing unit (GPU), etc.). The processor 605 includes one or more processors. In some embodiments, the data repository 530 may lack a processor and may be implemented as a data storage unit accessible to the server 520, for example, via the network 540. The network interface 610 allows the data repository 530 to send and receive data via the network 540. The network interface 610 includes one or more network interface cards (NICs). The cache unit 620 and the storage unit 630 store data or instructions. The cache unit 620 is configured to be more quickly accessible to the processor 605, for faster reading and writing of the data stored therein.

The cache unit 620 stores daily input and output (I/O) values for the class 622, and for each family 624, genus 626, and species 628 from the class 622. The input and output values may include any input and output values being modeled. For example, the input is the pressure and the output is an amount of a natural resource extracted from a geographic location defined by the class, family, genus, or species. In another example, the input is a temperature and the output is an amount of a food or a beverage consumed. In yet another example, the input is an air pollution level and the output is an amount of cough medication consumed. In an additional example, the input is an amount of pollen and the output is an amount of allergy medication consumed.

The storage unit 630 stores hourly input and output (I/O) values for the class 632, and for each family 634, genus 636, and species 638 from the class 632. The data stored in the storage unit 630 corresponds to that stored in the cache unit 620. However, the hourly values are more precise than the daily values, as there are 24 hours in a day. Thus, the storage unit 630 stores more information than the cache unit 620.

As shown in FIG. 6, daily values are stored in the cache unit 620 and hourly values are stored in the storage unit 630. However, other frequencies may be used, as long as the frequency for the cache unit 620 is less than that for the storage unit 630. In one example, the cache unit 630 stores hourly values and the storage unit stores values generated every minute or every second. In another example, the cache unit 620 stores values that are generated daily, and the storage unit 630 stores values that are generated once per minute. In yet another example, the cache unit 620 stores monthly or yearly values, and the storage unit 630 stores daily or hourly values.

Using the implementation shown in FIG. 6, the server 520 generates the graphical representations 100-400 using data from the cache unit 620. The server determines whether to access the storage unit 630 based on a size, at the display unit of the client device 510 displaying the graphical representations 100-400, of the graphical representation(s) and on an amount of time covered by the graphical representation(s). In some cases, the server 520 accesses the storage unit in a case where a distance on the time axis, in the graphical representation, corresponding to one time unit of the frequency of the cache unit 620 (e.g., one day for a daily frequency, as shown in FIG. 6) exceeds a threshold distance, measured, for instance, as a threshold number of pixels, a threshold number of inches, or a threshold number of centimeters. The threshold number of pixels is, for example, 50 pixels or 100 pixels. The threshold number of inches is, for example, 0.25 inches or 0.5 inches. The threshold number of centimeters is, for example, 1 centimeters or 1.5 centimeters.

FIG. 6 illustrates one example of the data repository 530. However, other examples of the data repository 530 can be used with the subject technology. In some cases, the daily genus I/O values 626 and the daily species I/O values 628 are all stored in the storage unit 630, rather than the cache unit 620, to save space in the cache unit 620, as values for the genus 626 and species 628 are, in some cases, accessed less frequently than values for the class 622 and family 624. According to other embodiments, the data repository 530 can have a single memory unit that includes both the cache unit 620 and the storage unit 630. In other words, the data repository 530 may lack separate cache and storage units.

Figure 7:
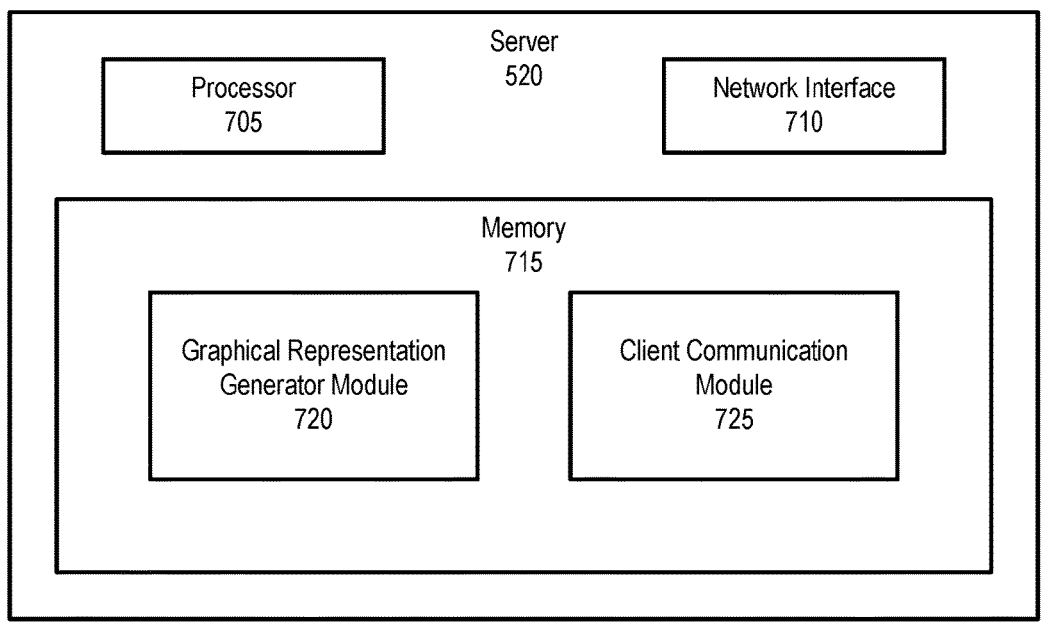
FIG. 7 is a block diagram of an example of the server of FIG. 5, according to some embodiments.

FIG. 7 is a block diagram of an example of the server 520 of FIG. 5. As shown, the server 520 includes a processor 705, a network interface 710, and a memory 715. The processor 705 executes machine instructions, which may be stored in the memory 715. While a single processor 705 is illustrated, the server 520 may include multiple processors arranged into multiple processing units (e.g., central processing unit (CPU), graphics processing unit (GPU), etc.). The processor 705 includes one or more processors. The network interface 710 allows the server 520 to send and receive data via the network 540. The network interface 710 includes one or more network interface cards (NICs). The memory 715 stores data or instructions. As shown, the memory 715 includes a graphical representation generator module 720 and a client communication module 725.

The graphical representation generator module 720 is configured to generate, based on data stored in the data repository 530, graphical representations, such as the graphical representations 100-400 of FIGS. 1-4, which are provided for display at the client device 510. According to some examples, the graphical representation generator module 720 accesses data at the data repository 530 and generates a time versus output or time versus input graph corresponding to the data. In some cases, the graphical representation module generates a multidimensional graph that represents the time, the input, and the output (e.g., in three dimensions). More details of examples of the operation of the graphical representation generator module 720 are provided in conjunction with FIG. 8.

The client communication module 725 is configured to provide the graphical representations, generated by the graphical representation generator module 720, to the client device 510 for display thereat. The client communication module 725 is configured to receive, from the client device 510, user input for interfacing with the graphical representation(s) and to cause the graphical representation(s) to be adjusted based on the user input. More details of examples of the operation of the client communication module 725 are provided in conjunction with FIG. 8.

As used herein, the term "configured" encompasses its plain and ordinary meaning. In some examples, a module (e.g., module 720 or 725) is configured to carry out operation(s) by storing code for the operation(s) in memory (e.g., memory 715). Processing hardware (e.g., processor 705) carries out the operations by accessing the appropriate locations in the memory. Alternatively, the module is configured to carry out the operation(s) by having the operation(s) hard-wired in the processing hardware.

Figure 8:
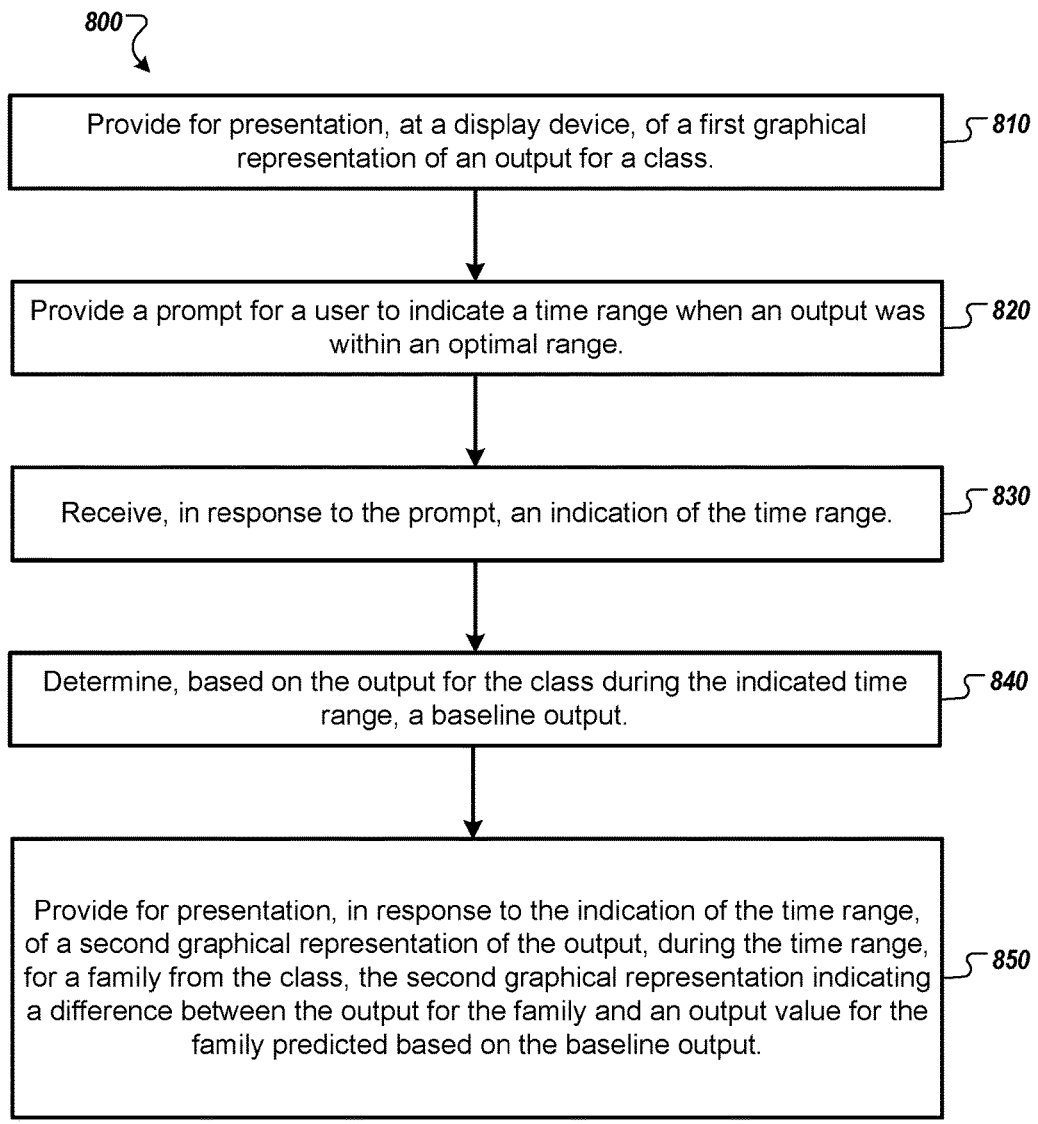
FIG. 8 is a flowchart illustrating an example method for providing a graphical representation of an output, according to some embodiments.

FIG. 8 is a flowchart illustrating an example method 800 for providing a graphical representation of an output. In some cases, the method 800 is implemented at the server 520, which communicates with the client device 510 and the data repository 530 over the network 540. The method 800 is initiated, for example, by the user of the client device 510 requesting information about output for a specified class from the server 520. The request is made via a web browser or via a special purpose application, executing at the client device 510, for accessing the server 520.

The method 800 begins at step 810, where the server 520, by operation of the graphical representation generator module 720 and the client communication module 725, provides for presentation, at a display device of the client device 510, of a first graphical representation of an output for a class (e.g., class 110 of FIG. 1). The first graphical representation is generated by accessing output values and, in some cases, input values or time values, from the data repository 530. Upon accessing the output values, the graphical representation generator module 720 is configured to generate a graph of the points. The client communication module 725 is configured to provide the graph for display at the client device 510, for example, by transmitting the graph to the client device 510 over the network 540.

At step 820, the server 520, by operation of the client communication module 725, provides a prompt for the user of the client device 510 to indicate a time range where the output was within an optimal range. In some cases, the input may be presented to the user adjacent to the graphical representations 100-400 or within the graphical representations 100-400, for example, adjacent to the graphs or in a table in a sidebar. Responsive to the prompt, the user indicates the time range where the output was within the optimal range. In one example, the user indicates the time range by selecting (e.g., by clicking and dragging a cursor or touching and dragging on a touchscreen) a region (e.g., region 201 of FIG. 2) of the graph in the first graphical representation.

As used herein, the phrase "optimal range" encompasses its plain and ordinary meaning. In some cases, "optimal range" refers to an ideal or semi-ideal range of the output. For example, the optimal range could correspond to the output being greater than a minimum bound, less than a maximum bound, or both greater than the minimum bound and less than the maximum bound.

At step 830, the server 520, by operation of the client communication module 725, receives, in response to the prompt, an indication of the time range. For example, an indication that the user selected the time range corresponding to the region 201 is transmitted from the client device 510 to the server 520.

At step 840, the server 520, by operation of the graphical representation generator module 720, determines based on the output for the class during the indicated time range, a baseline output. In some cases, the baseline output is represented as a constant (with a proportion being assigned to each family/genus/species, for example, based on a surface area, population, number of wells or mines, and the like, of the family/genus/species). In other cases, the baseline output is represented as a function of the input generated, for example, by applying regression analysis to the input and the output values. The function is applied to each family/genus/species to determine a predicted output for that family/genus/species.

At step 850, the server 520, by operation of the client communication module 725, provides for presentation, in response to the indication of the time range, of a second graphical representation of the output, during the time range, for a family (e.g., family 120, 130, or 140, as shown in FIG. 2) from the class (e.g., class 110). The second graphical representation indicates a difference between the actual output for the family (e.g., curves 221) and an output value for the family predicted based on the baseline output (e.g., curve 222). In some embodiments, the family is labeled in a case where, during the time range, a total output for the family is less than a predicted (based on the baseline output) total output value for the family multiplied by a multiplier (e.g., 80% or 90%). This indicates to the user that the family might be an outlier, which may be experiencing unusual circumstances that are reducing its output, possibly subjecting the family to further inquiry or study by the user. Labeling the family, in some examples, includes color-coding the family, highlighting the family, placing the family inside a box or an oval, or the like. In some cases, the labeling/attribution concept may be extended further than the family, for example, into the genus or species levels. In some cases, specific points in time that have output that is more than a threshold proportion (e.g., 5%, 10%, or 15%) below or above the baseline may be labelled. The labeling may be done automatically by the server 520 or manually by the user. After step 850, the method 800 ends.

In some cases, the first graphical representation is a two-dimensional graph relating output to time, as shown, for example, at class 110 of FIG. 1. The second graphical representation is a two-dimensional graph relating output to time for the family, as shown, for example, at family 120, 130, or 140 of FIG. 2. In other cases, the first graphical representation includes a multidimensional plot relating time to input, time to output, and input to output for the class. The second graphical representation includes a multidimensional plot relating time to input, time to output, and input to output for the family.

Various different definitions for the output, input, class, family, genus, and species can be used. According to some embodiments, the output is a natural resource output. The input is a weather-related condition. The class is a geographically-defined region, and the family is a geographically-defined sub-region of the class. The family is geographically subdivided into genera, which are further geographically subdivided into species.

Various use cases of the subject technology are possible. In one use case, the server 520 receives a representation of a change in the input for a family. The server 520 creates, based on the baseline input/output function, a model adjusting, based on the change in the input for the family, a displayed output for the family in the second graphical representation (generated in step 850) and a displayed output for the class in the first graphical representation (generated in step 810). The server 520 provides, to the client device 510, a visual representation (e.g., a graph) of the adjusted output for the family and the adjusted output for the class.

In another use case, the server 520 receives, from the client device 510, a user indication that a specified family, a specified genus, or a specified species is an outlier, which may be experiencing unusual circumstances. For the purpose of calculating the baseline, the server 520 removes, from the class, the specified family, the specified genus, or the specified species in response to the user indication. The server 520 adjusts the determined baseline output based on the removal of the specified family, the specified genus, or the specified species.

In yet another use case, after completing the steps 810-850 of the process 800, the server 520 receives a selection of the family. The server 520 provides, for presentation at the client device 510, of a third graphical representation of the output, during the time range, for a genus from the family. The third graphical representation indicates a difference between the output from the genus and an output value for the genus predicted based on the baseline output. The server 520 receives a selection of the genus. The server 520 provides, for presentation at the client device 510, of a fourth graphical representation of the output, during the time range, for a species from the genus. The fourth graphical representation indicates a difference between the output from the species and an output value for the species predicted based on the baseline output.

Figure 9:
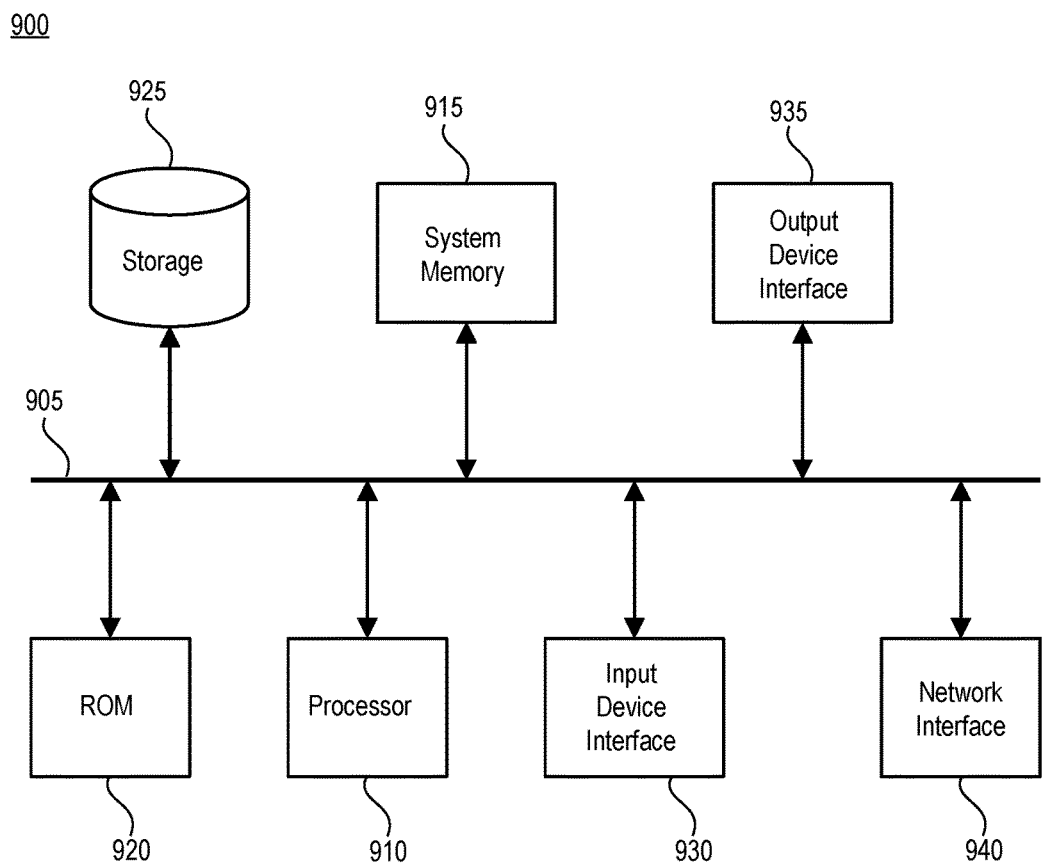
FIG. 9 is a block diagram illustrating an example electronic system with which some implementations of the subject technology can be implemented, according to some embodiments.

FIG. 9 is a block diagram illustrating an example electronic system 900 with which some implementations of the subject technology are implemented. For example, one or more of the client device 510, the server 520, or the data repository 530 may be implemented using the arrangement of the electronic system 900. The electronic system 900 can be a computer (e.g., a mobile phone, PDA), or any other sort of electronic device. Such an electronic system includes various types of computer readable media and interfaces for various other types of computer readable media. Electronic system 900 includes a bus 905, processor(s) 910, a system memory 915, a read-only memory (ROM) 920, a permanent storage device 925, an input device interface 930, an output device interface 935, and a network interface 940.

The bus 905 collectively represents all system, peripheral, and chipset buses that communicatively connect the numerous internal devices of the electronic system 900. For instance, the bus 905 communicatively connects the processor(s) 910 with the ROM 920, the system memory 915, and the permanent storage device 925.

From these various memory units, the processor(s) 910 retrieves instructions to execute and data to process in order to execute the processes of the subject technology. The processor(s) can include a single processor or a multi-core processor in different implementations.

The ROM 920 stores static data and instructions that are needed by the processor(s) 910 and other modules of the electronic system. The permanent storage device 925, on the other hand, is a read-and-write memory device. This device is a non-volatile memory unit that stores instructions and data even when the electronic system 900 is off. Some implementations of the subject technology use a mass-storage device (for example, a magnetic or optical disk and its corresponding disk drive) as the permanent storage device 925. Other implementations use a removable storage device (for example a floppy disk, flash drive, and its corresponding disk drive) as the permanent storage device 925.

Like the permanent storage device 925, the system memory 915 is a read-and-write memory device. However, unlike storage device 925, the system memory 915 is a volatile read-and-write memory, such as a random access memory (RAM). The system memory 915 stores some of the instructions and data that the processor needs at runtime. In some implementations, the processes of the subject technology are stored in the system memory 915, the permanent storage device 925, or the ROM 920. For example, the various memory units include instructions for providing a graphical representation of an output in accordance with some implementations. From these various memory units, the processor(s) 910 retrieves instructions to execute and data to process in order to execute the processes of some implementations.

The bus 905 also connects to the input and output device interfaces 930 and 935. The input device interface 930 enables the user to communicate information and select commands to the electronic system. Input devices used with input device interface 930 include, for example, alphanumeric keyboards and pointing devices (also called "cursor control devices"). Output device interface 935 enables, for example, the display of images generated by the electronic system 900. Output devices used with output device interface 935 include, for example, printers and display devices, for example cathode ray tubes (CRT) or liquid crystal displays (LCD). Some implementations include devices, for example, a touch screen, that function as both input and output devices.

Finally, as shown in FIG. 9, bus 905 also couples electronic system 900 to a network (not shown) through a network interface 940. In this manner, the electronic system 900 can be a part of a network of computers (for example, a local area network (LAN), a WAN, or an Intranet), or a network of networks (for example, the Internet). Any or all components of electronic system 900 can be used in conjunction with the subject technology.

Figure 10A:
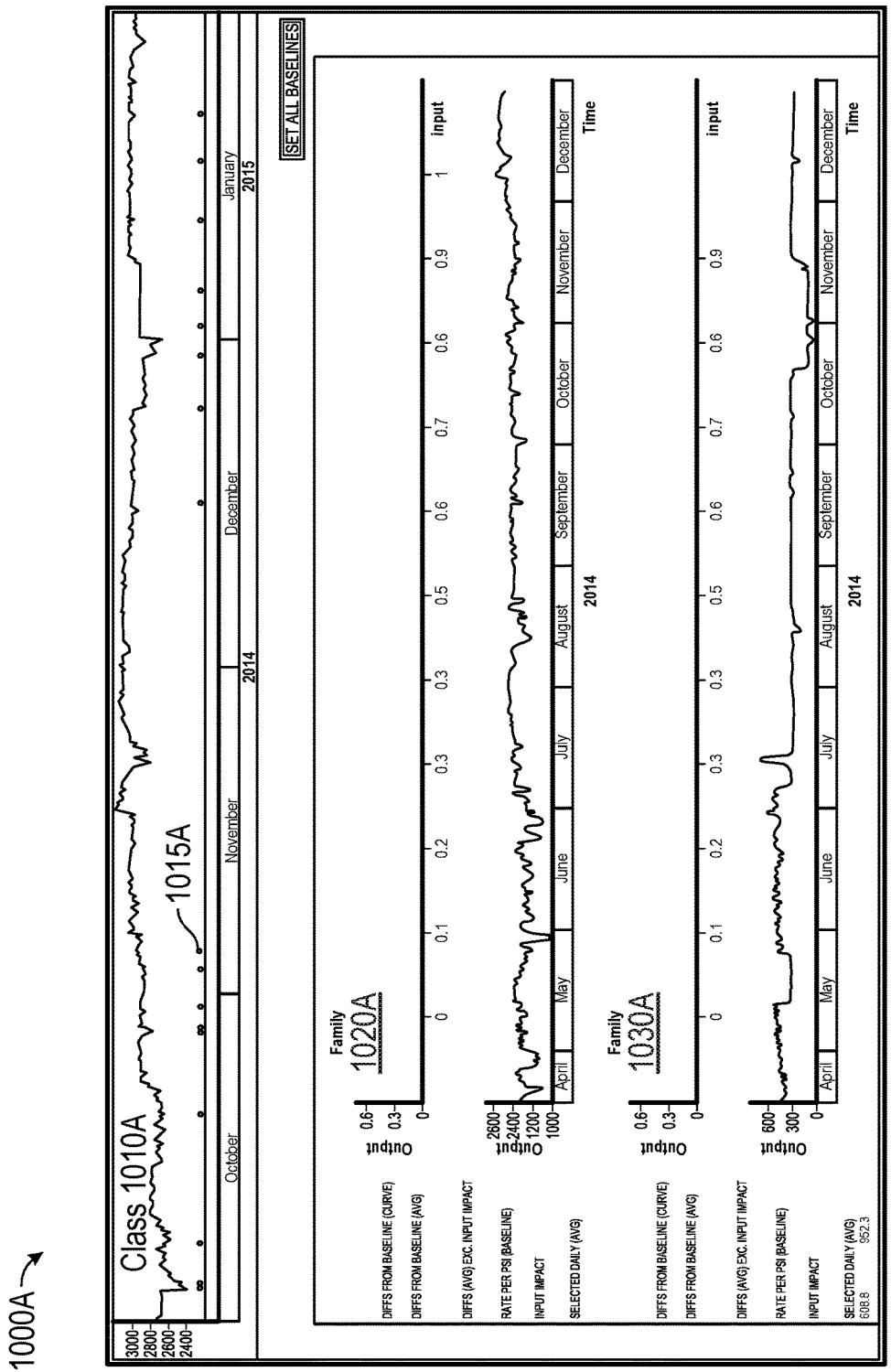
FIGS. 10A-10F illustrate example graphical representations that are provided in some embodiments of the subject technology, according to some embodiments.

FIGS. 10A-10F illustrate example graphical representations that are provided in some embodiments of the subject technology. Upon initiating an application associated with the subject technology or accessing a webpage in a web browser associated with the subject technology, the graphical representation 1000A of FIG. 10A is presented at the client device 510. At the top of the graphical representation 1000A, the total output for the class 1010A is presented. Below the total output for the class 1010A, output for the family 1020A and for the family 1030A is presented in output versus input and output versus time graphs. The class 1010A is associated with several events (represented with dots), including event 1015A. In one example, the input is pressure and the output is the amount of a natural resource (e.g., oil or gas) that is extracted from a source (e.g., oil or gas field) from which the resource is extracted.

Figure 10B:
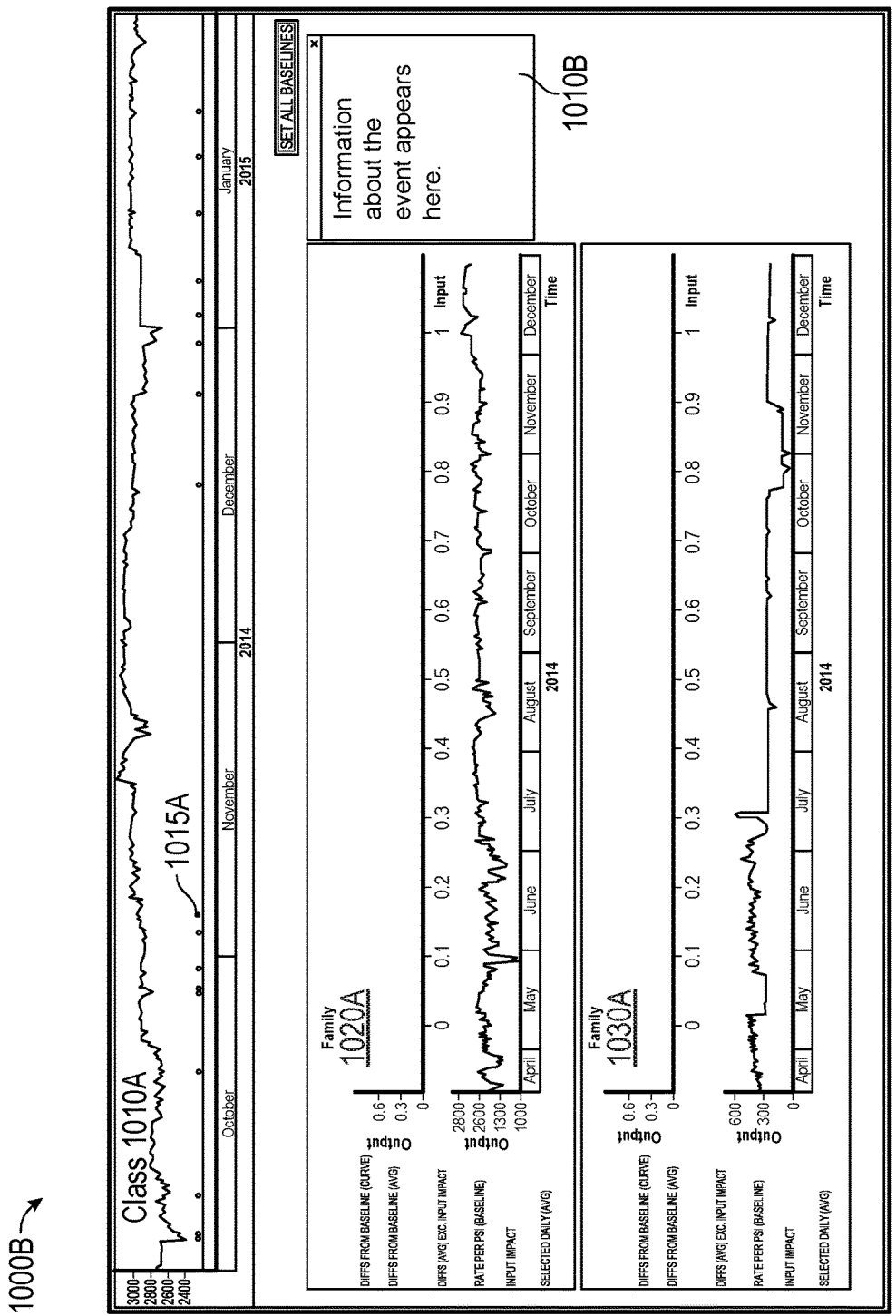

FIG. 10B illustrates the graphical representation 1000B, which is presented when the user selects the event 1015A. The information about the class 1010A and the families 1020A and 1030A is presented, similarly to the graphical representation 1000A. In addition, in some cases, the dot representing the event 1015A may be highlighted (not shown as highlighted for simplicity) responsive to the user's selection. Furthermore, information 1010B about the event 1015A is presented within the graphical representation 1000B. The information 1010B, in some examples, is associated with an email message or a notation in an electronic log book.

Figure 10C:
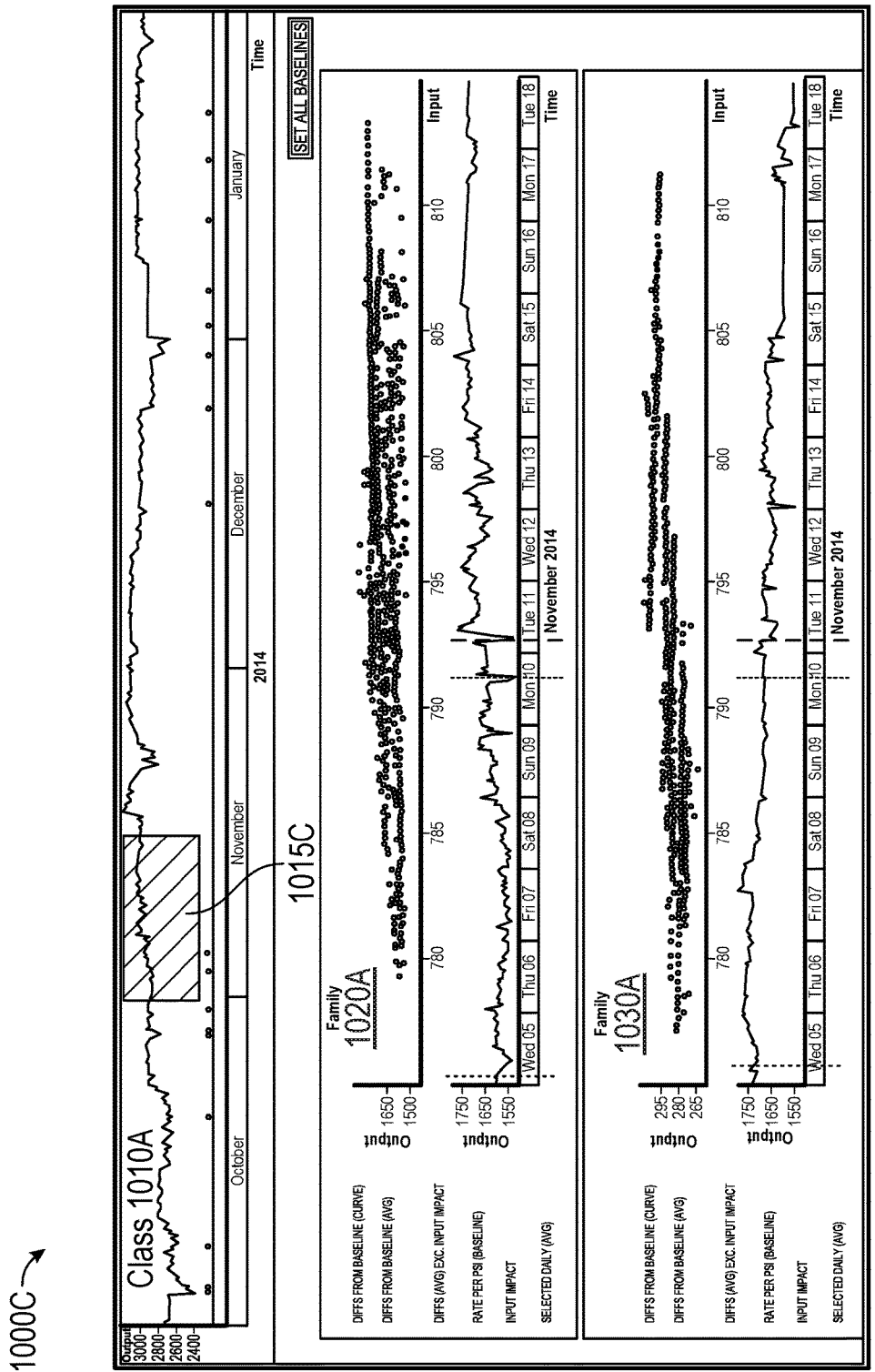

FIG. 10C illustrates the graphical representation 1000C Similarly to the graphical representation 1000A, the graphical representation 1000C includes the class 1010A and the families 1020A and 1030A. In the output versus time graph for the class 1010A, a time range 1015C is selected by the user, for example, by touching the touchscreen or clicking and dragging a mouse cursor over the time range 1015C in the output versus time graph. Responsive to the selection of the region 1015C, an output versus input and an output versus time graph is presented for each family 1020A and 1030A. In the output versus time graphs, the covered time range corresponds to the selected time range 1015C. In the output versus input graphs, some points are selected by the user. The selected points are marked, and corresponding points on the output versus time graphs are indicated.

Figure 10D:
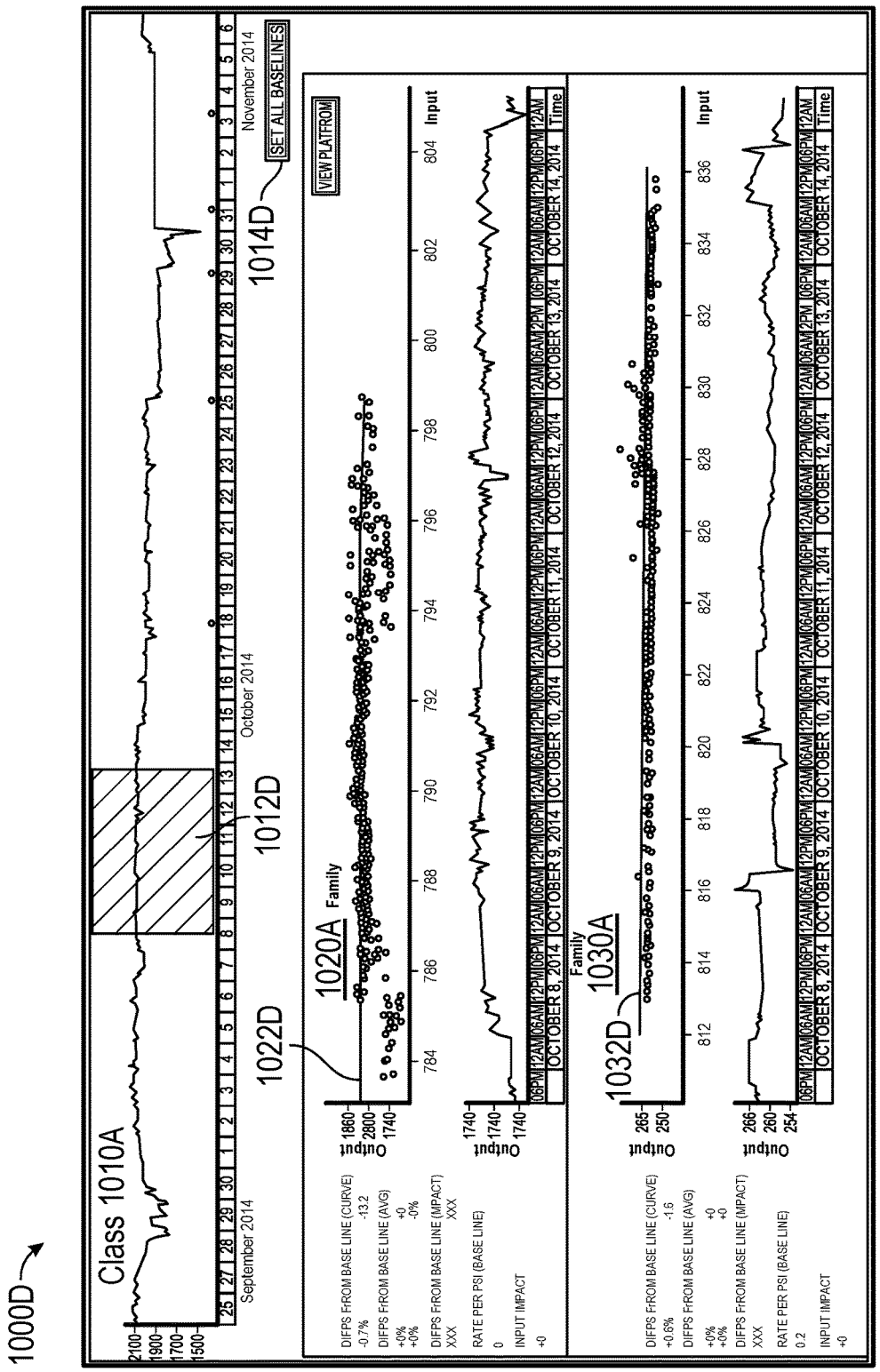

FIG. 10D illustrates the graphical representation 1000D. The graphical representation 1000D includes the class 1010A and the families 1020A and 1030A of the graphical representation 1000A. In addition, the time range 1012D is selected (in a manner similar to the selection of the time range 1015C) and is set as a baseline by selecting the "set all baselines" button 1014D. Responsive to setting the baseline, the baseline is illustrated as a curve 1022D in the output versus input graph for the family 1020A and as a curve 1032D in the output versus input graph for the family 1030A. The baseline curves 1022D and 1032D correspond to input and output conditions that would be expected based on the baseline set by the time range 1012D. In some cases, the user selects the time range 1012D by identifying a time when the output for the class 1010A was at an optimal level.

Figure 10E:
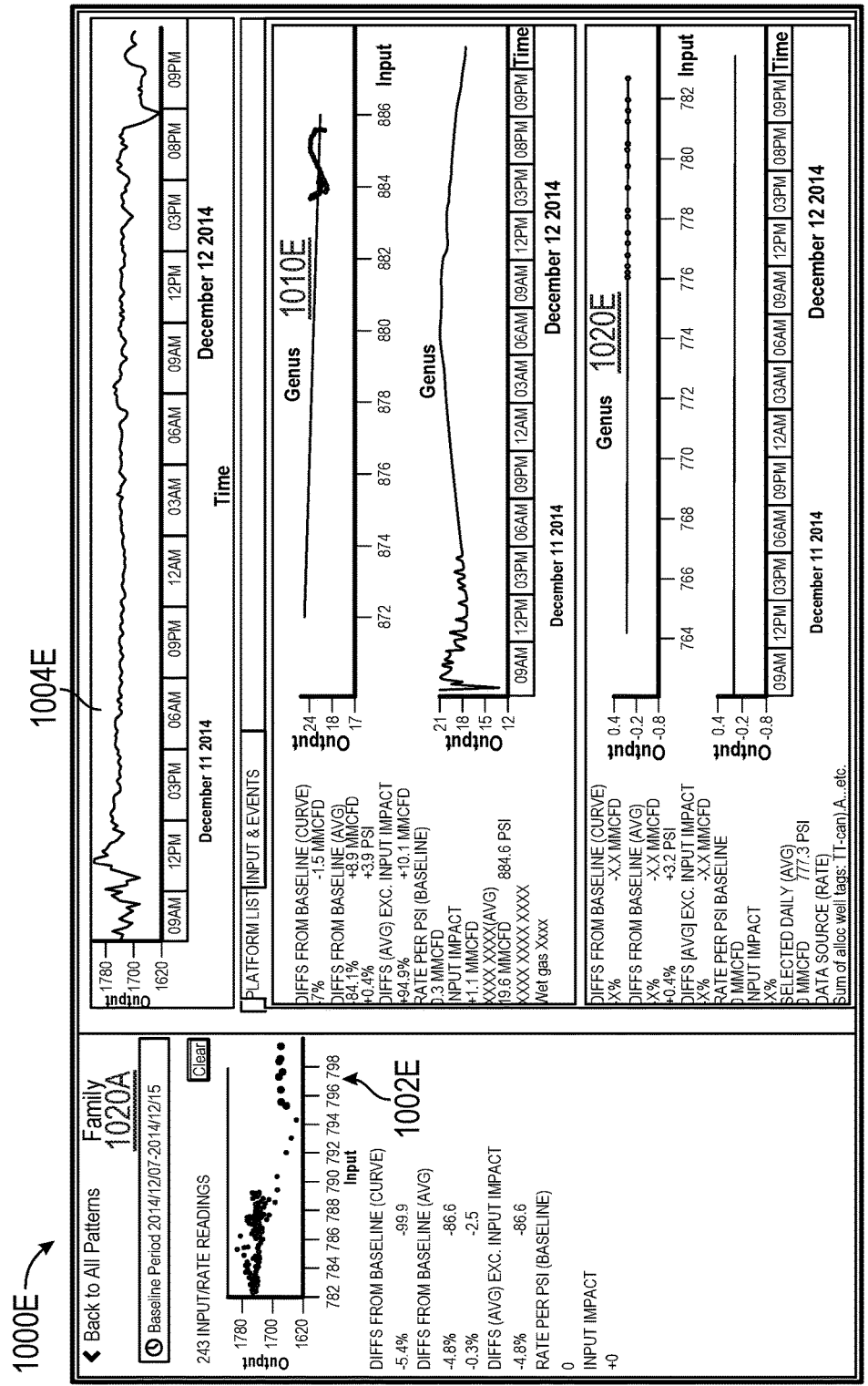

FIG. 10E illustrates the graphical representation 1000E, which is presented in response to a selection of the family 1020A in FIG. 10A. In response to the selection, an output versus input graph 1002E and an output versus time graph 1004E for the family 1020A is illustrated. In addition, output versus input and output versus time graphs are illustrated for genera 1010E and 1020E of the family 1020A. As shown, some points in the output versus input graphs 1002E are selected. Responsive to their selection, corresponding portions of the graphs 1004E, 1010E, and 1020E are highlighted or otherwise indicated.

Figure 10F:
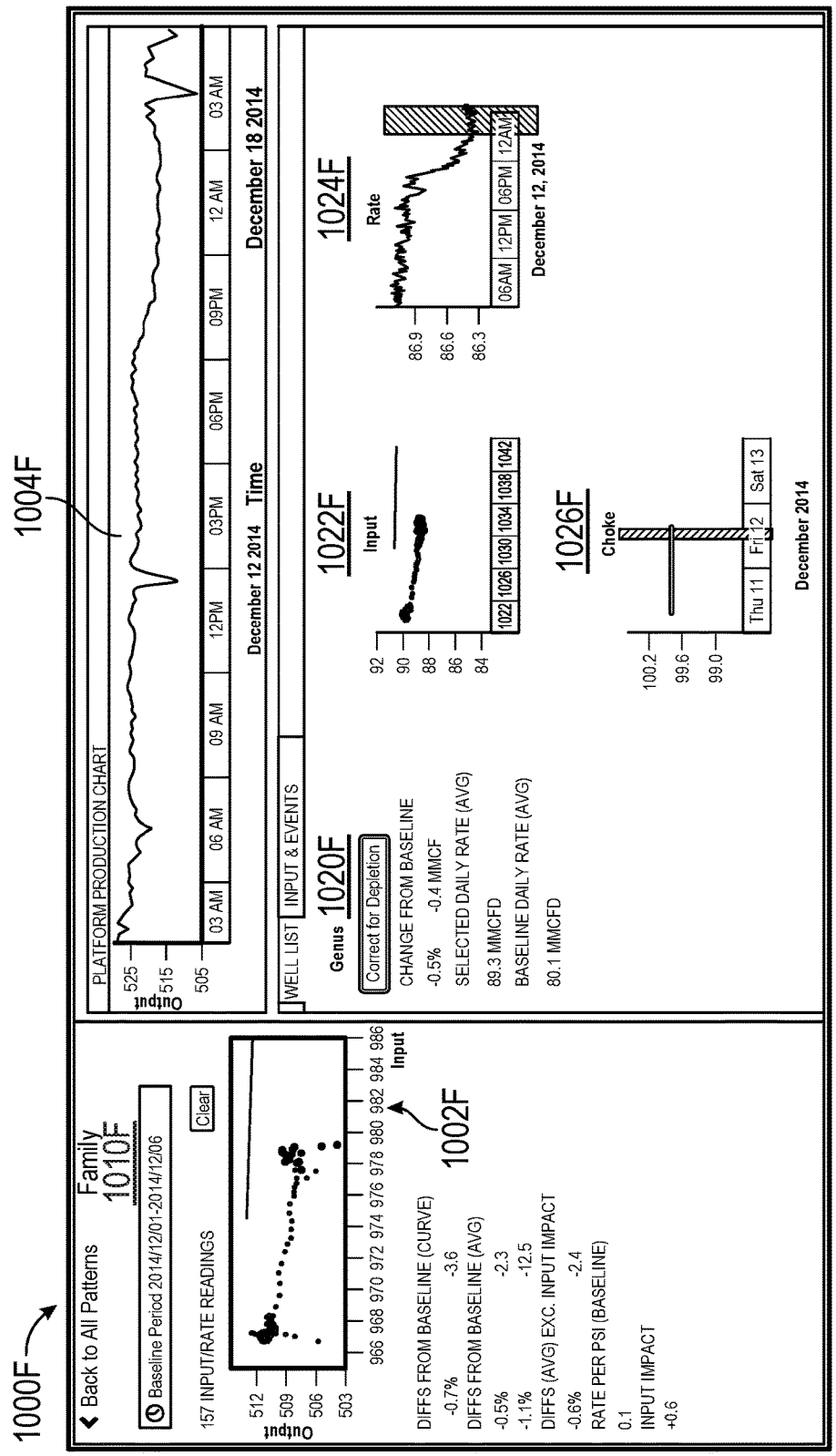

FIG. 10F illustrates the graphical representation 1000F associated with a family 1010F. The family 1010F is associated with an output versus input graph 1002F and an output versus time graph 1004F. The family 1010F includes the genus 1020F. Graphs for the input 1022F, rate 1024F, and choke 1026F of the genus 1020F are provided within the graphical representation 1000F. Some points on the output versus input graph 1002F are selected. These points may be highlighted within the other graphs 1004F, 1022F, 1024F, and 1026F.

The above-described features and applications can be implemented as software processes that are specified as a set of instructions recorded on a computer readable storage medium (also referred to as computer readable medium). When these instructions are executed by one or more processor(s) (which may include, for example, one or more processors, cores of processors, or other processing units), they cause the processor(s) to perform the actions indicated in the instructions. Examples of computer readable media include, but are not limited to, compact disk read-only memories (CD-ROMs), flash drives, RAM chips, hard drives, erasable programmable read-only memories (EPROMs), and the like. The computer readable media does not include carrier waves and electronic signals passing wirelessly or over wired connections.

In this specification, the term "software" is meant to include firmware residing in ROM or applications stored in magnetic storage or flash storage, for example, a solid-state drive, which can be read into memory for processing by a processor. Also, in some implementations, multiple software technologies can be implemented as sub-parts of a larger program while remaining distinct software technologies. In some implementations, multiple software technologies can also be implemented as separate programs. Finally, any combination of separate programs that together implement a software technology described here is within the scope of the subject technology. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

These functions described above can be implemented in digital electronic circuitry, in computer software, firmware, or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, for example microprocessors, storage, and memory, that store computer program instructions in a machine-readable or computer-readable medium (alternatively referred to as computer-readable storage media, machine-readable media, or machine-readable storage media). Some examples of such computer-readable media include RAM, ROM, CD-ROM, recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., secure digital (SD) cards, mini-SD cards, micro-SD cards, etc.), magnetic or solid state hard drives, read-only and recordable Blu-Ray® discs, ultra-density optical discs, any other optical or magnetic media, and floppy disks. The computer-readable media can store a computer program that is executable by at least one processor and includes sets of instructions for performing various operations. Examples of computer programs or computer code include machine code (for example, produced by a compiler) and files including higher-level code that are executed by a computer, an electronic component, or a microprocessor using an interpreter.

While the above discussion primarily refers to microprocessors or multi-core processors that execute software, some implementations are performed by one or more integrated circuits, for example, application specific integrated circuits (ASICs) or field programmable gate arrays (FPGAs). In some implementations, such integrated circuits execute instructions that are stored on the circuit itself.

As used in this specification and any claims of this application, the terms "computer," "server," "processor," and "memory" all refer to electronic or other technological devices. These terms exclude people or groups of people. For the purposes of the specification, the terms display or displaying mean displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, e.g., a CRT or LCD monitor, for displaying information to the user, and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user (for example, by sending web pages to a web browser on a user's client device in response to requests received from the web browser).

The subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a LAN and a WAN, an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some aspects of the disclosed subject matter, a server transmits data (e.g., a hypertext markup language (HTML) page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of example approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be implemented. Moreover, the separation of various system components illustrated above should not be understood as requiring such separation, and it should be understood that the described program components and systems can generally be integrated together in a single software product or packaged into multiple software products.

Various modifications to these aspects will be readily apparent, and the generic principles defined herein may be applied to other aspects. Thus, the claims are not intended to be limited to the aspects shown herein, but is to be accorded the full scope consistent with the language claims, where reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject technology.

A phrase, for example, an "aspect," does not imply that the aspect is essential to the subject technology or that the aspect applies to all configurations of the subject technology. A disclosure relating to an aspect may apply to all configurations, or one or more configurations. A phrase, for example, an aspect, may refer to one or more aspects and vice versa. A phrase, for example, a "configuration," does not imply that such configuration is essential to the subject technology or that such configuration applies to all configurations of the subject technology. A disclosure relating to a configuration may apply to all configurations, or one or more configurations. A phrase, for example, a configuration, may refer to one or more configurations and vice versa.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the disclosed subject matter has been described with reference to specific example embodiments, various modifications and changes may be made to these embodiments without departing from the broader scope of embodiments of the present disclosure.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

In this document, the terms "a" or "an" are used, as is common in patent documents, to include one or more than one, independent of any other instances or usages of "at least one" or "one or more." In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim are still deemed to fall within the scope of that claim. Moreover, in the following claims, the terms "first," "second," "third," and so forth are used merely as labels, and are not intended to impose numerical requirements on their objects.

What is claimed is:

1. A system comprising:
one or more processors; and
a memory comprising instructions which, when executed by the one or more processors, cause the one or more processors to perform operations comprising:
providing for presentation, at a display device, of a first graphical representation of an output for a class;
receiving a selection of a time range for the class;
determining, based on the output for the class during the selected time range, a baseline output;
in response to the selection of the time range, providing for presentation a second graphical representation of the output, during the time range, for a family from the class, the second graphical representation indicating a difference between the output for the family and an output value for the family predicted based on the baseline output.

2. A method comprising:
providing for presentation, at a display device, of a first graphical representation of an output for a class;

receiving a selection of a time range for the class;
determining, based on the output for the class during the selected time range, a baseline output;
in response to the selection of the time range, providing for presentation a second graphical representation of the output, during the time range, for a family from the class, the second graphical representation indicating a difference between the output for the family and an output value for the family predicted based on the baseline output.

3. The method of claim 2, wherein receiving the selection of the time range for the class comprises:
providing a prompt for a user to indicate the time range when the output was within an optimal range; and
receiving, in response to the prompt, the indication of the time range.

4. The method of claim 3, wherein:
the output comprises natural resource output;
an input, associated with the output within the first graphical representation, comprises a weather-related condition;
the class comprises a geographically-defined region; and
the family comprises a geographically-defined sub-region of the class.

5. The method of claim 4, wherein:
the first graphical representation comprises a multidimensional plot relating time to input, time to output, and input to output for the class; and
the second graphical representation comprises a multidimensional plot relating time to input, time to output, and input to output for the family.

6. The method of claim 4, further comprising:
receiving a representation of a change in the input for the family;
adjusting, based on the change in the input for the family, a displayed output for the family in the second graphical representation and a displayed output for the class in the first graphical representation; and
providing a visual representation of the adjusted output for the family and the adjusted output for the class.

7. The method of claim 2, further comprising:
receiving a selection of the family; and
providing for presentation, in response to the selection of the family, of a third graphical representation of the output, during the time range, for a genus from the family, the third graphical representation indicating a difference between the output for the genus and an output value for the genus predicted based on the baseline output.

8. The method of claim 7, further comprising:
receiving a selection of the genus; and
providing for presentation, in response to the selection of the genus, of a fourth graphical representation of the output, during the time range, for a species from the genus, the fourth graphical representation indicating a difference between the output for the species and an output value for the species predicted based on the baseline output.

9. The method of claim 2, further comprising:
receiving a user indication that a specified family, a specified genus, or a specified species is an outlier;
removing, from the class, the specified family, the specified genus, or the specified species in response to the user indication; and
adjusting the determined baseline output based on removal of the specified family, the specified genus, or the specified species.

10. The method of claim 2, further comprising:
labeling the family in a case where, during the time range, a total output for the family is less than a predicted total output value for the family multiplied by a multiplier, the predicted total output value being predicted based on the baseline output.

11. The method of claim 2, wherein:
providing for presentation of the first graphical representation of the output for the class comprises: accessing, at a cache unit of a data repository, the output for the class, wherein the data repository stores the output for the class at a first frequency in the cache unit, and wherein the data repository stores the output for the class at a second frequency in a storage unit;
the method further comprising:
determining whether to access the storage unit of the data repository based on a size, at the display unit, of the first graphical representation and on an amount of time to be covered by the first graphical representation.

12. The method of claim 11, wherein:
the first frequency comprises once per day; and
the second frequency comprises once per hour or once per minute.

13. A non-transitory machine-readable medium comprising instructions which, when executed by one or more processors of a machine, cause the machine to perform operations comprising:
providing for presentation, at a display device, of a first graphical representation of an output for a class;
receiving a selection of a time range for the class;
determining, based on the output for the class during the selected time range, a baseline output;
in response to the selection of the time range, providing for presentation a second graphical representation of the output, during the time range, for a family from the class, the second graphical representation indicating a difference between the output for the family and an output value for the family predicted based on the baseline output.

14. The machine-readable medium of claim 13, wherein receiving the selection of the time range for the class comprises:
providing a prompt for a user to indicate the time range when the output was within an optimal range; and
receiving, in response to the prompt, the indication of the time range.

15. The machine-readable medium of claim 14, wherein:
the output comprises natural resource output;
an input, associated with the output within the first graphical representation, comprises a weather-related condition;
the class comprises a geographically-defined region; and
the family comprises a geographically-defined sub-region of the class.

16. The machine-readable medium of claim 15, wherein:
the first graphical representation comprises a multidimensional plot relating time to input, time to output, and input to output for the class; and
the second graphical representation comprises a multidimensional plot relating time to input, time to output, and input to output for the family.

17. The machine-readable medium of claim 15, further comprising:
receiving a representation of a change in the input for the family;
adjusting, based on the change in the input for the family, a displayed output for the family in the second graphical representation and a displayed output for the class in the first graphical representation; and providing a visual representation of the adjusted output for the family and the adjusted output for the class.

18. The machine-readable medium of claim 13, the operations further comprising:

receiving a selection of the family; and providing for presentation, in response to the selection of the family, of a third graphical representation of the output, during the time range, for a genus from the family, the third graphical representation indicating a difference between the output for the genus and an output value for the genus predicted based on the baseline output.

19. The machine-readable medium of claim 18, the operations further comprising:

receiving a selection of the genus; and providing for presentation, in response to the selection of the genus, of a fourth graphical representation of the output, during the time range, for a species from the genus, the fourth graphical representation indicating a difference between the output for the species and an output value for the species predicted based on the baseline output.

20. The machine-readable medium of claim 13, the operations further comprising:

receiving a user indication that a specified family, a specified genus, or a specified species is an outlier;

removing, from the class, the specified family, the specified genus, or the specified species in response to the user indication; and adjusting the determined baseline output based on removal of the specified family, the specified genus, or the specified species.

\* \* \* \* \*

UNITED STATES PATENT AND TRADEMARK OFFICE
CERTIFICATE OF CORRECTION

PATENT NO. : 9,652,139 B1  
APPLICATION NO. : 15/216476  
DATED : May 16, 2017  
INVENTOR(S) : Shankar et al.

Page 1 of 1

It is certified that error appears in the above-identified patent and that said Letters Patent is hereby corrected as shown below:

On page 4, in Column 1, under "Other Publications", Line 44, delete "1404489,5," and insert --1404489.5,-- therefor Signed and Sealed this  
Eighth Day of May, 2018

Andrei Iancu  
*Director of the United States Patent and Trademark Office*